(12) United States Patent
Iwakiri et al.

(10) Patent No.: US 6,354,264 B1
(45) Date of Patent: Mar. 12, 2002

(54) CONTROL SYSTEM FOR SELF-IGNITION TYPE GASOLINE ENGINE

(75) Inventors: Yasunori Iwakiri, Yokohama; Koudai Yoshizawa, Kanagawa; Atsushi Teraji, Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/657,363

(22) Filed: Sep. 7, 2000

(30) Foreign Application Priority Data

Sep. 7, 1999 (JP) .............................. 11-253370
Sep. 1, 2000 (JP) ........................... 2000-265956

(51) Int. Cl.⁷ .......................... F02B 11/00; F02D 43/00
(52) U.S. Cl. ............... 123/305; 123/90.15; 123/406.21; 123/435; 123/436; 123/486; 123/568.21
(58) Field of Search ........................ 123/27 R, 90.15, 123/295, 305, 406.2, 406.21, 406.22, 406.33, 406.37, 406.41, 406.45, 435, 436, 478, 480, 486, 568.14, 568.21; 60/285

(56) References Cited

U.S. PATENT DOCUMENTS

| 5,497,737 A | 3/1996 | Nakamura | 123/90.15 |
| 5,531,193 A | 7/1996 | Nakamura | 123/90.15 |
| 5,535,716 A * | 7/1996 | Sato et al. | 123/27 R X |
| 6,213,086 B1 * | 4/2001 | Chmela et al. | 123/27 R X |
| 6,234,123 B1 * | 5/2001 | Iiyama et al. | 123/90.15 |
| 6,267,097 B1 * | 7/2001 | Urushihara et al. | 123/305 |
| 6,293,246 B1 * | 9/2001 | Tanahashi et al. | 123/305 |

FOREIGN PATENT DOCUMENTS

| JP | 7-71279 | 3/1995 |
| JP | 8-151951 | 6/1996 |
| JP | 2763593 | 3/1998 |
| JP | 11-132066 | 5/1999 |
| JP | 2973829 | 9/1999 |
| JP | 2982581 | 9/1999 |
| JP | 2000-64863 | 2/2000 |

* cited by examiner

Primary Examiner—Tony M. Argenbright
(74) Attorney, Agent, or Firm—Foley & Lardner

(57) ABSTRACT

An engine control unit controls a self-ignition gasoline engine which is capable of changing a combustion condition of the engine between a self-ignition combustion and a spark-ignition combustion according to an engine operating condition. The control unit executes detecting an combustion condition in the engine, detecting a self-ignition limit of a region for executing the self-ignition combustion on the basis of the combustion condition, and varying a combustion parameter for the combustion during the self-ignition combustion so that the combustion condition approaches the self-ignition combustion limit and a self-ignition combustion operation is executed under a condition maintaining the self-ignition limit.

13 Claims, 28 Drawing Sheets

CONTROL SYSTEM FOR SELF-IGNITION TYPE GASOLINE ENGINE

BACKGROUND OF THE INVENTION

The present invention relates to a compression self-ignition type gasoline engine which selectively executes spark-ignition combustion and self-ignition combustion according to an engine operating condition, and more particularly to a control system for controlling such a compression self-ignition type gasoline engine.

In a compression self-ignition combustion process, combustions start at plural points in a combustion chamber, and thereby a high combustion speed is obtained. Further, such compression self-ignition combustion ensures stable combustion even under a lean air-fuel ratio condition, as compared with the spark-ignition combustion, and thereby improves fuel consumption. Furthermore, since the combustion temperature of the compression self-ignition combustion is lower than that of the spark-ignition combustion, it is possible to largely decrease NOx in exhaust gases. Additionally, if fuel and air are previously and sufficiently mixed with each other before the compression self-ignition, NOx is further decreased.

SUMMARY OF THE INVENTION

However, such self-ignition combustion is largely affected by a combustion parameter so that if the combustion parameter is offset from a target combustion parameter, the self-ignition combustion generates knocking or unstable combustion and is affected by aging or dispersion of the engine in production. Although Japanese Patent Provisional Publication No. H8-151951 discloses an engine control system which is arranged to vary a correction value for a knocking level and a correction value for an ignition timing in order to respond to the dispersion or aging of a spark-ignition type engine or a knock sensor thereof, a self-ignition type gasoline engine has to be controlled on taking account of knocking and combustion stability during the self-ignition combustion. Therefore, even if the mentioned art is simply adapted to the self-ignition type gasoline engine, there yet remain several problems in control of the self-ignition combustion.

It is an object of the present invention to provide a control system which highly and stably controls an efficiency of self-ignition combustion of a compression self-ignition gasoline engine regardless the aging or dispersion of engines in production.

A control system of a self-ignition gasoline engine in accordance with the present invention is arranged to change a combustion condition of the engine between a self-ignition combustion and a spark-ignition combustion according to an operating condition of the engine. The control system comprises a combustion condition detector detecting a combustion condition in the engine and an engine control unit connected to the combustion condition detector. The engine control unit detects a self-ignition limit of a self-ignition combustion region on the basis of the combustion condition, and varies a combustion parameter during the operation of the self-ignition combustion so that the combustion condition approaches the self-ignition combustion limit and the self-ignition combustion operation is executed under a condition maintaining the self-ignition limit.

DETAILED DESCRIPTION OF THE INVENTION

Referring to FIGS. 1 to 18, there is shown a first embodiment of a control system for self-ignition type gasoline engine according to the present invention. The control system according to the present invention is arranged so that the engine combustion is changed between compression self-ignition combustion and spark-ignition according to the engine operating condition.

Figure 1:
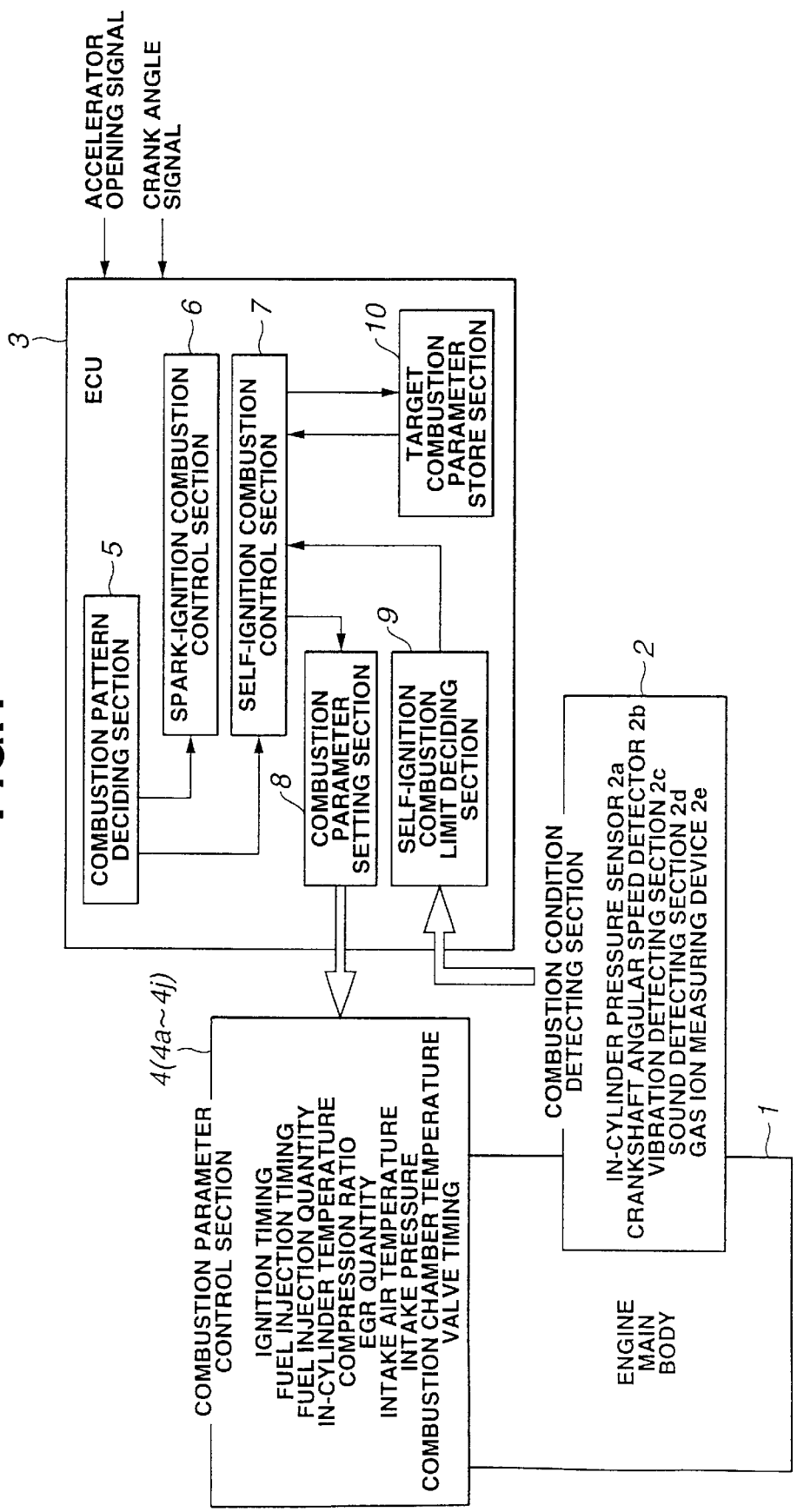
FIG. 1 is a system view of a first embodiment of a compression self-ignition type gasoline engine according to the present invention.

As shown in FIG. 1, the internal combustion engine of the self-ignition type comprises an engine main body 1, a combustion condition detecting section 2, an engine control unit (ECU) 3 and a combustion parameter control section 4.

Engine main body 1 is provided with a cylinder block, a cylinder head, a crankshaft, a piston and a connecting rod for each cylinder, and at least one intake valve and at least one exhaust valve for each cylinder.

Combustion condition detecting section 2 comprises an in-cylinder pressure sensor 2a for detecting a pressure of a combustion chamber for each cylinder, a crankshaft angular speed detector 2b, a vibration sensor 2c for detecting a vibration of a combustion chamber defining member, a sound sensor 2d for detecting sounds of the combustion chamber defining member, a gas ion detector 2e for detecting ion of ignited combustion gas in combustion chamber.

Combustion condition detecting section 2 decides a self-ignition combustion limit on the basis of one of the following two definitions:

First, when the engine operates in a condition that a representative cylinder of the engine reaches the self-ignition combustion limit, it is decided that the engine is put in the self-ignition combustion limit. Second, when the engine operates in a condition that at least one of cylinders of the engine reaches the self-ignition combustion limit, it is decided that the engine is put in the self-ignition combustion limit.

Combustion condition detecting section 2 can decide which cylinder reached the self-ignition combustion limit from one of a first type detection unit and a second type detection unit. The first type detection unit is arranged to directly detect the condition in the cylinders by providing a sensor to each cylinder or to the representative cylinder. The second type detection unit is arranged to decide that at least one of cylinders reaches the self-ignition combustion limit. More specifically, the first type detection unit includes the combustion gas ion measuring device 2e, which can diagnose the combustion condition in a cylinder by a measuring an electric current of voltage due to the ion in the combustion gas by utilizing the in-cylinder pressure sensor 2a, an electrode of a spark plug. Japanese Patent Provisional Publication No. H5-87036 discloses the first type detection unit for detecting the voltage due to the ion in the combustion gas. The second type detection unit includes a vibration detector 2c for detecting vibration of a cylinder head or cylinder block, a sound detector 2d for detecting sound of the cylinder head or cylinder block, or a crankshaft angular speed detector 2b.

A knock sensor may be applied to the vibration senor, and a microphone may be applied to the sound sensor. One vibration sensor and one sound sensor may be installed to the engine, and ECU 3 may decide the self-ignition limit on the basis of the detection result of the sensors. For example, in a case of an in-line four-cylinder engine, two or three detectors may be provided at portions between cylinders, and ECU 3 may decide from the combination data thereof that the specified (representative) cylinder reaches the self-ignition limit, and may decide that the engine is put in the self-ignition combustion limit.

The crankshaft angular speed sensor 2b detects the crankshaft angular speed by measuring a time differential of an output signal of a crankshaft angular speed sensor or a time period per a predetermined rotation angle of the crankshaft. ECU 3 decides on the basis of the change of the angular speed corresponding to an angular acceleration whether the cylinder of the engine is put in the knocking limit. Further, ECU 3 decides from the fluctuation rate of the angular speed whether the cylinder of the engine is put in the stability limit. For example, ECU 3 decides which cylinder is put in the knocking limit or stability limit, from the angular speed at a crankshaft rotational phase corresponding to an expansion stroke of each cylinder.

The devices and method for detecting the combustion condition in cylinders of the engine as explained above are known arts.

ECU 3 comprises a combustion pattern deciding section 5 for deciding a combustion pattern from the accelerator opening and the crank angle sensor signal, a spark-ignition combustion control section 6 for controlling the engine during the spark-ignition combustion, a self-ignition combustion control section 7 for controlling the engine during the self-ignition combustion, a combustion parameter setting section 8 for setting each combustion parameter during the self-ignition combustion, a self-ignition combustion limit deciding section 9 for deciding whether the cylinder is put in the self-ignition combustion limit by deciding the signal level of the sensor output signals of the combustion condition detecting section 2, and a target combustion parameter storage section 10 for storing the set value of each combustion parameter during the self-ignition combustion limit.

The self-ignition combustion limit decided by self-ignition combustion limit deciding section 9 includes the knocking limit and the combustion stability limit.

An example of the decision method executed by the self-ignition combustion limit deciding section 9, which corresponds to the sensors in the combustion condition detecting section 2, will be discussed hereinafter. A conventional sensor or the combination of plural conventional sensors may be employed as a sensor for deciding the self-ignition combustion limit.

In the case that the in-cylinder pressure sensor 2a is employed as the sensor employed to decide the self-ignition combustion limit, ECU 3 decides that the combustion condition of the cylinder reaches the knocking limit, when the frequency of the condition that a combustion pressure becomes greater than a first peak pressure corresponding to a load or air-fuel ratio previously stored in the ECU 3, reaches a predetermined level. Also, ECU 3 may decide that the combustion condition of the cylinder reaches the knocking limit, when the change of the in-cylinder pressure corresponding to the pressure increase ratio becomes larger than or equal to a predetermined level.

In the case that the crankshaft angular speed detector 2b is employed to detect the knocking limit, ECU 3 decides that the cylinder is put in the knocking limit when the change of the angular speed (angular acceleration) becomes greater than a predetermined level.

In the case that the crankshaft angular speed detector 2b is employed to detect the stability limit, ECU 3 decides that the cylinder is put in the stability limit when the fluctuation rate of the angular speed becomes greater than or equal to the predetermined level. In other way, ECU 3 decides that the cylinder is in the stability limit when the frequency of conditions that the angular speed at the rotational phase corresponding to the expansion stroke of the specified cylinder is smaller than the multiple of the angular speed of the other cylinder and the predetermined ratio, becomes greater than a predetermined level.

In the case that the knocking limit is detected on the basis of the detection signal of the combustion gas ion detector, ECU 3 decides that the cylinder is put in the knocking limit, when the frequency of conditions, that the peak value of the energized current wave-form in the combustion chamber is larger than a first predetermined value, becomes greater than a predetermined level.

In the case that the stability limit is detected on the basis of the detection signal of the combustion gas ion detector, ECU 3 decides that the cylinder is put in the stability limit, when the frequency of conditions, that the peak value of the energized current wave-form in the combustion chamber is smaller than a second predetermined value, becomes greater than a predetermined level.

Combustion parameter control section 4 comprises an ignition timing control unit 4a, a fuel injection timing control unit 4b, a fuel injection quantity control unit 4c, an in-cylinder temperature control unit 4d, a compression ratio control unit 4e, an exhaust gas recirculation (EGR) control unit 4f, an intake air temperature control unit 4g, an intake pressure control unit 4h, a combustion chamber temperature control unit 4i and a valve timing control unit 4j.

Ignition timing control unit 4a controls a spark-ignition timing of each spark plug for each cylinder. Fuel injection timing control unit 4b controls a fuel injecting timing to each cylinder. Fuel injection quantity control unit 4c controls a quantity of fuel injected to each cylinder. In-cylinder temperature control unit 4d controls a temperature in each cylinder by controlling a quantity of EGR. Compression ratio control unit 4e controls a compression ratio for each cylinder by varying a volume of each combustion chamber or by controlling a close timing of intake valves. EGR control unit 4f controls the quantity of EGR by the operation of an EGR valve of a valve timing. Intake air temperature control unit 4g controls a temperature of intake air by means of an inter cooler and an intake heater. Intake pressure control unit 4h controls the pressure of the intake air by means of a throttle opening, a turbocharger, or a supercharger. Combustion chamber temperature control unit 4i controls the temperature of the combustion chamber defining wall by controlling the quantity of coolant. Valve timing control unit 4j controls valve timings of intake and exhaust valves for each cylinder. Therefore, combustion parameter control section 4 controls the combustion chamber parameters including ignition timing, fuel injection timing, fuel injection quantity, in-cylinder temperature, compression ratio, EGR quantity, intake air temperature, intake pressure, combustion chamber temperature and valve timing.

Figure 2:
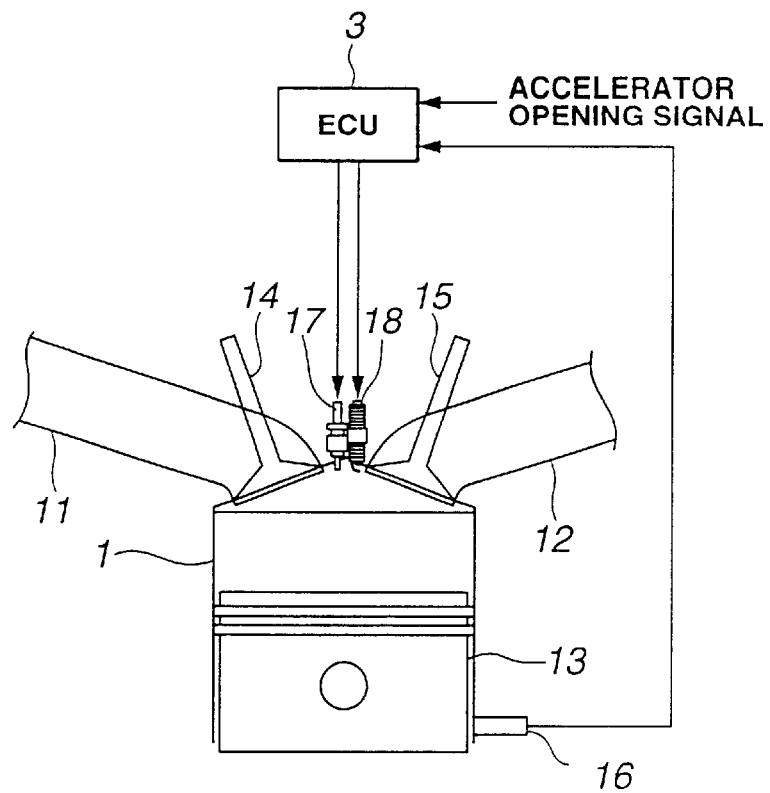
FIG. 2 is a schematic view of the engine according to the first embodiment.

FIG. 2 shows a control system of the self-ignition and spark-ignition selective engine in accordance with the first embodiment of the present invention. As shown in FIG. 2, engine main body 1 comprises intake port 11, exhaust port 12, piston 13, intake valve 14, exhaust valve 15, crank angle sensor 16, fuel injection unit 17 and ignition plug 18.

As shown in FIG. 1, ECU 3 for controlling engine main body 1 comprises combustion pattern deciding section 5, spark-ignition combustion control section 6, self-ignition combustion control section 7, combustion parameter setting section 8, combustion condition detecting section 2, self-ignition combustion limit deciding section 9 and target combustion parameter storage section 10. These sections 2 and 5–10 are previously provided in ECU 3 in the form of programs for the microcomputer.

ECU 3 decides the operating condition of engine main body 1 and decides the combustion pattern, on the basis of the engine speed indicative signal detected by crank angle sensor 16, the accelerator opening signal indicative of a load detected by the accelerator opening sensor (not shown). Further, ECU 3 calculates the fuel injection quantity, the fuel injection timing and the spark timing according to the engine operating condition. On the basis of the calculation result, ECU 3 outputs control signals to fuel injection unit 17 and spark plug 18.

Disposed at an upstream side of intake port 11 are an intake system constituted by a throttle valve for controlling the intake air quantity, an airflow meter for measuring the intake air quantity, an air cleaner and ducts.

Figure 3:
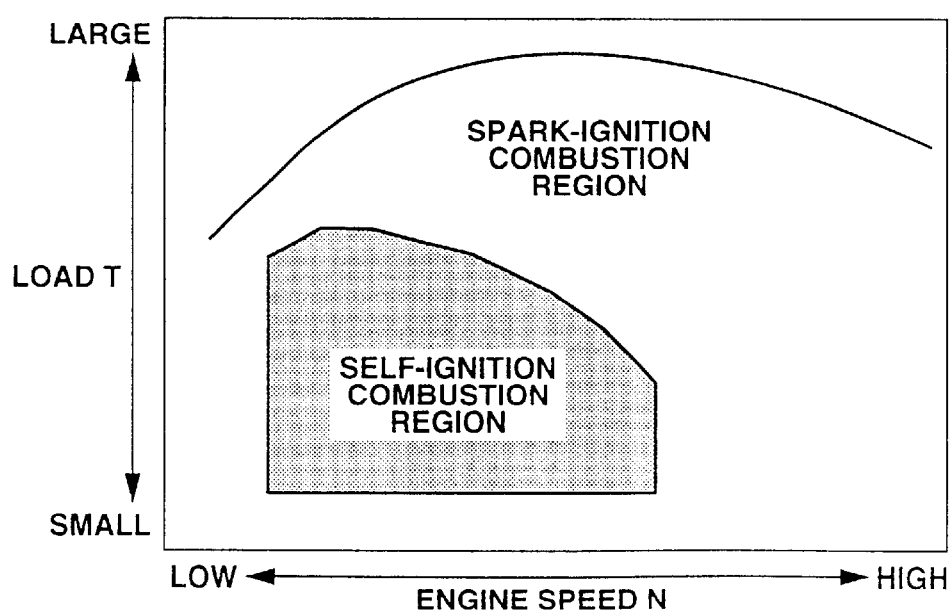
FIG. 3 is a graph showing a relationship of a combustion pattern with respect to an engine speed and an engine load.

The self-ignition and spark-ignition engine and control system thereof of the first embodiment performs the control shown in FIG. 3. That is, the compression self-ignition combustion is executed under a special operating condition under a low engine speed and a low or intermediate load condition. The spark-ignition combustion is executed under an extremely low load condition, a high load condition and a high engine speed condition.

Next, the manner of operation of the first embodiment according to the present invention will be discussed.

Figure 4:
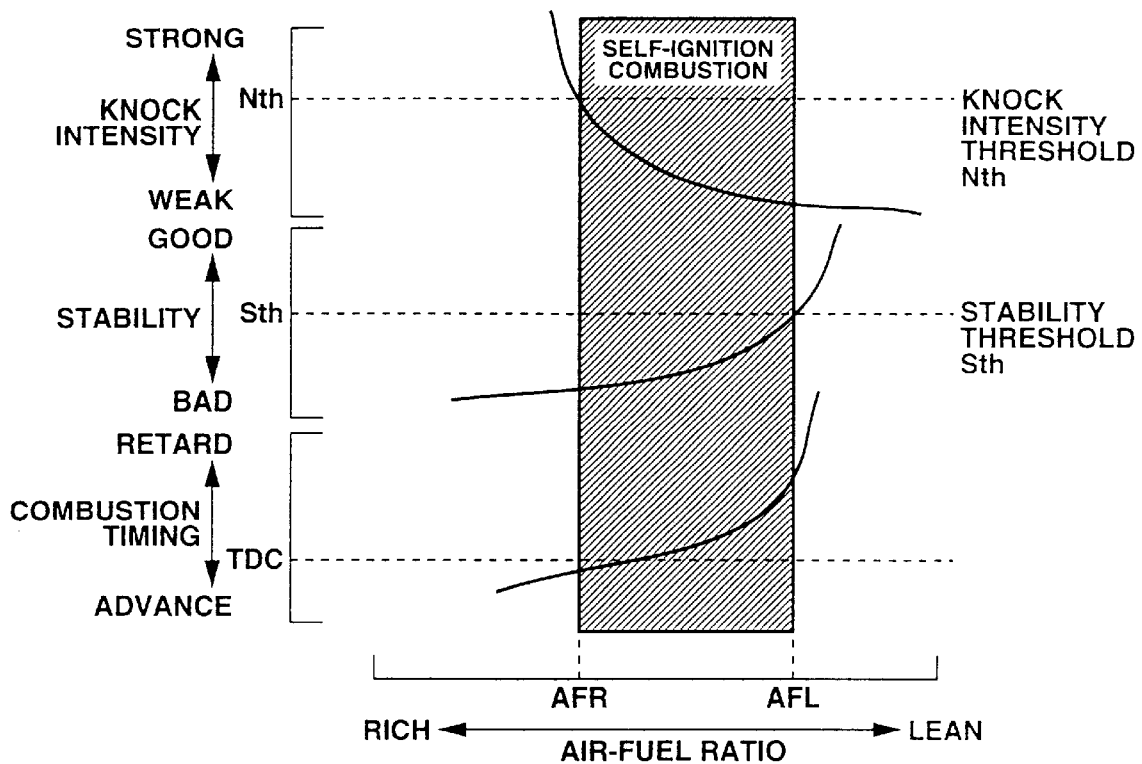
FIG. 4 is a graph for explaining a knock intensity, a stability and a combustion timing relative to the air-fuel ratio during a compression self-ignition combustion.

FIG. 4 shows a range where the self-ignition combustion relative to the air-fuel ratio is realized. In this range, the fuel injection has been started at a timing sufficiently advanced from a top death point, and mixture condition of air and fuel has been in a pre-mixing condition. The combustion stability is degraded by shifting the air-fuel ratio toward a lean side, thereby the torque fluctuation of the engine is increased. Therefore, the stability limit is determined at a limit within a condition of satisfying a design value of the internal combustion engine or a characteristic of a vehicle equipped with this engine, as a stability threshold Sth. The air-fuel ratio AFL taking the stability threshold Sth is a lean limit.

On the other hand, the knock intensity increases (is intensified) according the shifting of the air-fuel ratio to a rich side. Therefore, the rich limit is the air-fuel ratio AFR in the knocking threshold Nth. Further, the air-fuel region defined by the stability limit AFL and the knocking limit air-fuel ratio AFR is the self-ignition combustion realizing range. That is, the self-ignition combustion is realized within a limited air-fuel ratio range. Herein, the air-fuel ratio is employed as an indicator (index) for representing a ratio between air and fuel. Even when residual gas or EGR gas is included in the mixture, the similar inclination is performed. In such a case, a horizontal axis is a ratio G/F of a total gas quantity of fresh air and burned gas and the quantity of fuel.

Although FIG. 3 shows the self-ignition combustion realized region relative to the air-fuel ratio acting as the combustion parameter, the invention is not limited to this. Even if this self-ignition combustion realized region may be provided relative to the other parameter such as the fuel ignition timing IT, fuel injection quantity q, in-cylinder temperature, compression ratio, EGR quantity, intake air temperature, intake air pressure, combustion chamber wall temperature or ignition timing ADV. That is, when the combustion parameter is varied so as to promote the combustion in the cylinder, the knock intensity increases. When the combustion parameter is varied so as to degrade the combustion, the stability is degraded.

Figure 5:
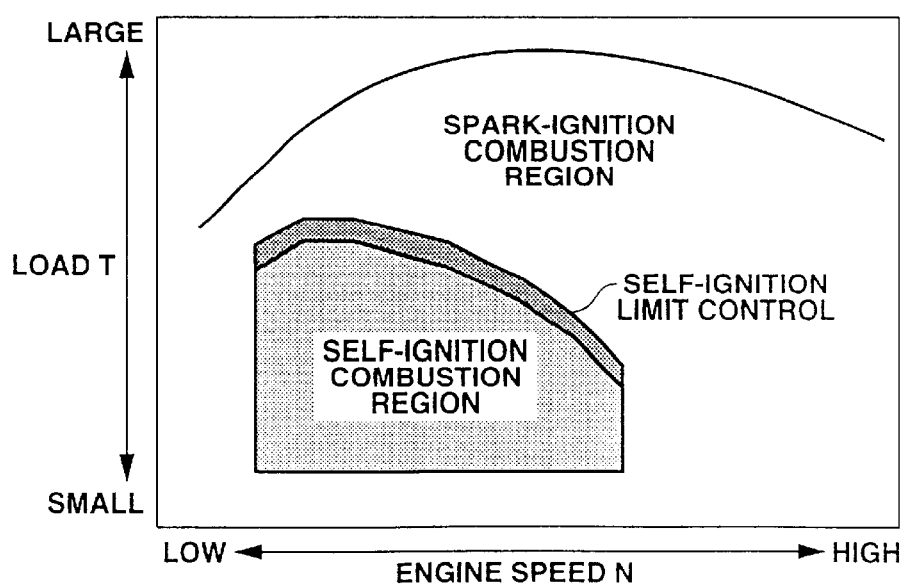
FIG. 5 is a graph showing the self-ignition limit control region of the first embodiment.

FIG. 5 shows a self-ignition limit control region where the self-ignition limit control of the first embodiment is executed. The present embodiment is arranged to execute the self-ignition limit control at a high-load region in the self-ignition combustion region. The condition of the self-ignition limit is the knocking limit.

Figure 6:
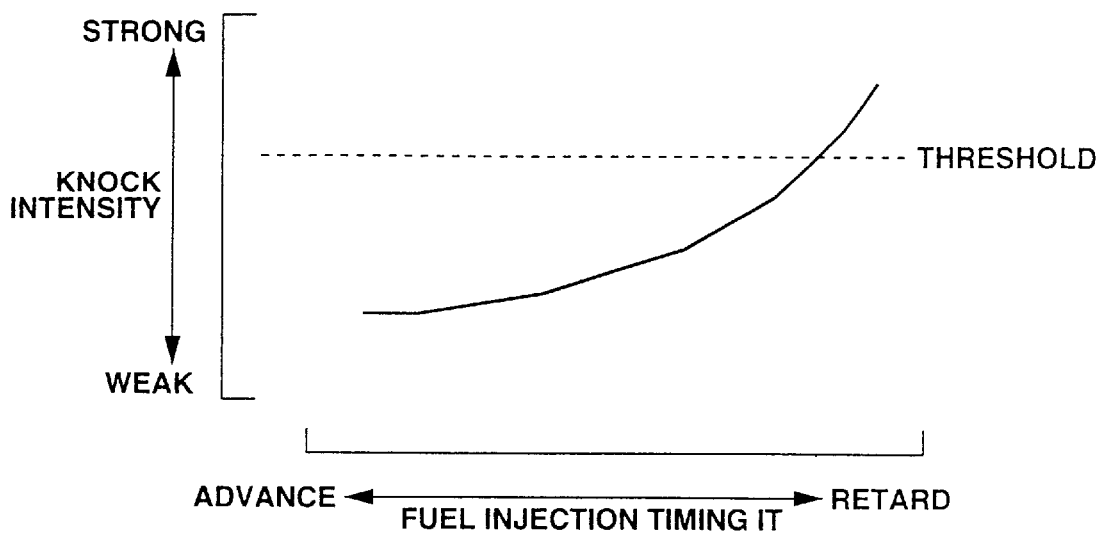
FIG. 6 is a graph showing a relationship between a fuel injection timing IT and the knock intensity.

FIG. 6 shows a relationship between the fuel injection timing IT and the knock intensity in the case that the fuel injection timing IT is employed as the combustion control parameter. As is clearly shown in FIG. 6, when the fuel injection timing IT is retarded at the moment near the top death point, the mixture of air and fuel is promoted in stratification, and therefore the knocking is intensified. Accordingly, it is possible to control the combustion condition into the knocking limit condition by controlling the fuel ignition timing IT according to the detected knock intensity. In some engine operating conditions, a longer time period is necessary for starting the self-ignition. Therefore, if the fuel injection timing is retarded, the time period becomes too short for starting the self-ignition, and the knocking is weakened. In such a knocking weakened case, the control of the fuel ignition timing is executed in reverse relative to the above-mentioned control.

Figure 7:
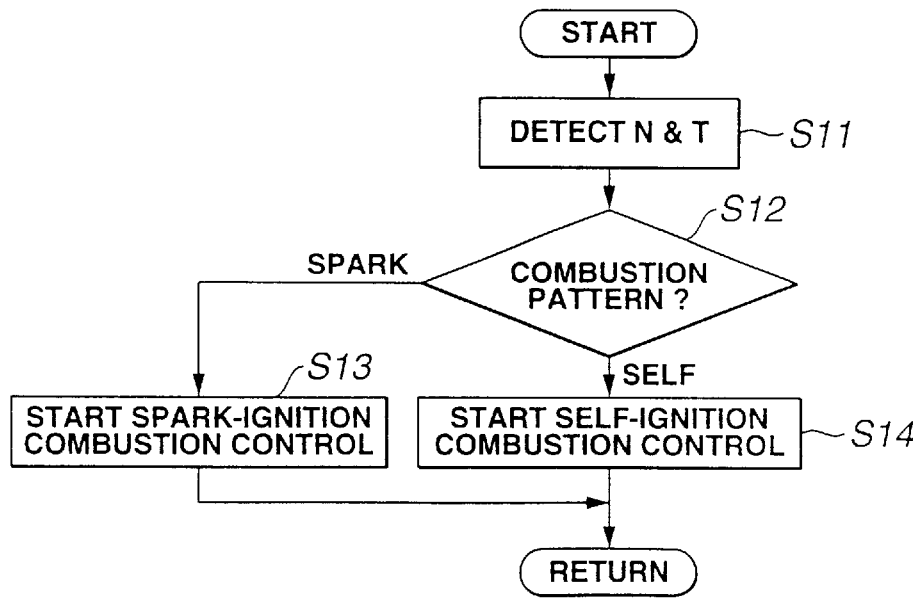
FIG. 7 is a flowchart showing a combustion pattern control of the first embodiment.

FIG. 7 shows a flowchart of a combustion pattern control executed in the first embodiment. At step S11, ECU 3 detects the engine speed N and the load T of the engine through the crank angle signal and the accelerator opening signal. At step S12, ECU 3 decides from the map shown in FIG. 3 whether the combustion pattern is the spark-ignition combustion or the self-ignition combustion. When ECU 3 decides at step S12 that the combustion pattern is the spark-ignition combustion, the routine proceeds to step S13 wherein the spark-ignition combustion control is started. When ECU 3 decides at step S14 that the combustion pattern is the self-ignition combustion, the routine proceeds to step S14 wherein the self-ignition combustion control is started. After the execution of step S13 or S14, the routine returned to the main program.

Figure 8:
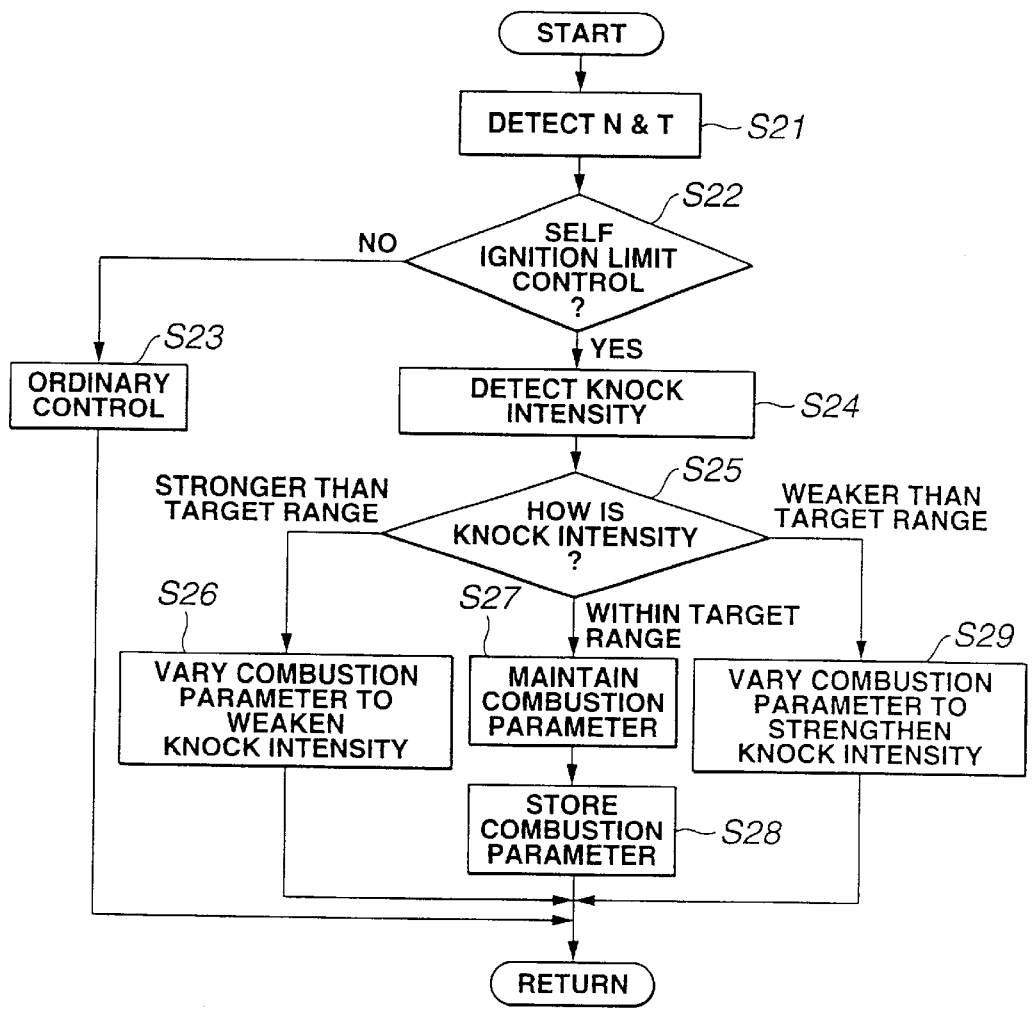
FIG. 8 is a flowchart showing a self-ignition limit control of the first embodiment.

FIG. 8 shows a flowchart of the self-ignition limit control executed in the first embodiment. At step S21, ECU 3 detects the engine speed N and the load T. At step S22, ECU 3 decides on the basis of the detected engine speed N and the load T and the map shown in FIG. 5 whether or not the self-ignition limit control is executed. When the decision at step S22 is negative, the routine proceeds to step S23 wherein an ordinary combustion control is executed. When the decision at step S22 is affirmative, the routine proceeds to step S24 wherein ECU 3 detects the knock intensity. At step S25 following to the execution of step S24, ECU 3 decides whether the knock intensity is stronger than or weaker than or within a target range. When ECU 3 decides the knock intensity is stronger than the target range, the routine proceeds to step S26 wherein ECU 3 varies the combustion parameter so as to weaken the knock intensity. When ECU 3 decides the knock intensity is weaker than the target range, the routine proceeds to step S29 wherein ECU 3 varies the combustion parameter so as to strengthen the knock intensity. When ECU 3 decides the knock intensity is within the target range, the routine proceeds to step S27 wherein ECU 3 maintains the combustion parameter. At step S28 following to step S27, ECU 3 stores the combustion parameter maintained at step S27. This process shortens the time period necessary for controlling to the knocking limit by using the stored combustion parameter when the engine operating condition in future corresponds to the condition whose combustion parameter has been stored in ECU 3.

By executing the above-mentioned control, even when the engine is degraded by aging or even when product dispersion as to the engine is generated, the control system according to the present invention can execute the self-ignition combustion without degrading the knocking.

Although the first embodiment has been shown and described to employ the fuel injection timing IT as a combustion parameter, the present invention is not limited to this and may employ the other combustion parameters.

Figure 9:
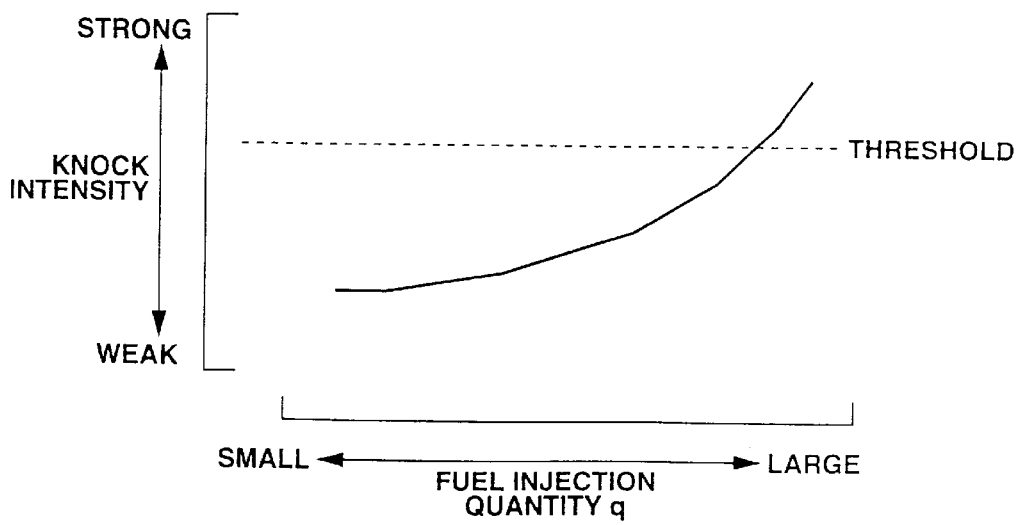
FIG. 9 is a graph showing a relationship between a fuel injection quantity and the knock intensity.

FIG. 9 shows a relationship between fuel injection quantity q and the knock intensity. As shown in FIG. 9, the knocking becomes strong according to the increase of the fuel injection quantity q, and becomes weak according to the decrease of fuel injection quantity q. Therefore, it is possible to control the combustion condition at the knocking limit by controlling the fuel injection quantity q. Since the fuel injection quantity q is varied by a very small quantity to control the knocking limit, the load is not fluctuated by the very small variation.

Figure 10:
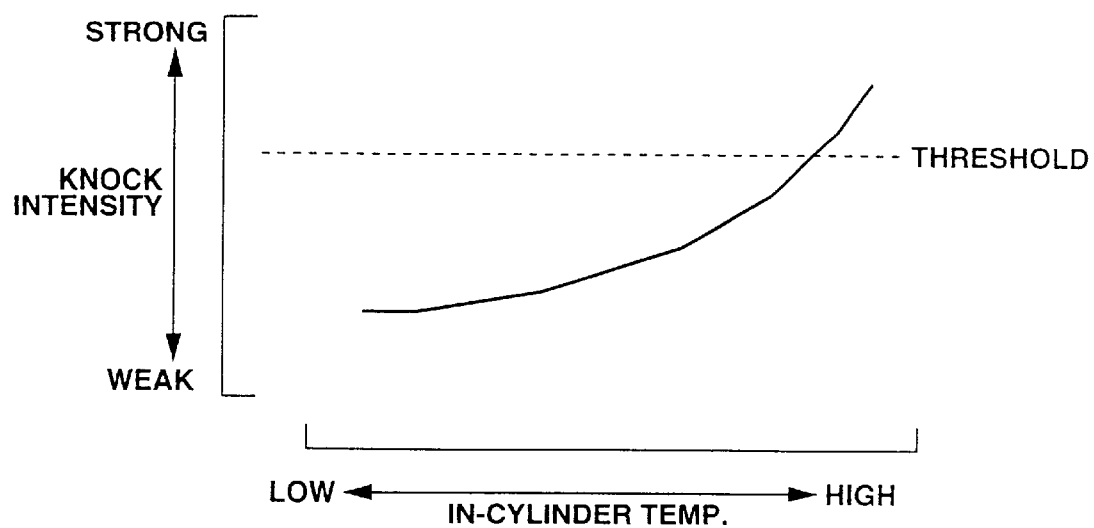
FIG. 10 is a graph showing a relationship between an in-cylinder temperature and the knock intensity.

FIG. 10 shows a relationship between the in-cylinder temperature and the knock intensity. As shown in FIG. 10, the knocking becomes strong according to the raising of the in-cylinder temperature and becomes weak according to the dropping of the in-cylinder temperature. Therefore, it is possible to control the combustion condition at the knocking limit by controlling the in-cylinder temperature. The in-cylinder temperature can be controlled by means of an internal EGR having high temperature property or an external EGR having low temperature property.

Figure 11:
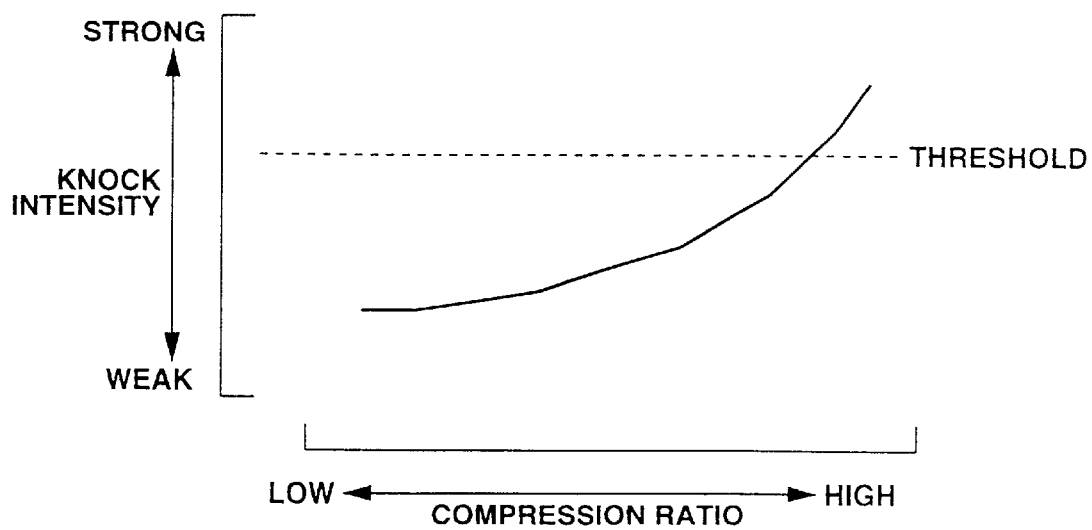
FIG. 11 is a graph showing a relationship between a compression ratio and the knock intensity.

FIG. 11 shows a relationship between the compression ratio and the knock intensity. As shown in FIG. 11, the knocking becomes strong according to the increase of the compression ratio and becomes weak according to the decrease of the compression ratio. Therefore, it is possible to control the combustion condition at the knocking limit by controlling the compression ratio. The compression ratio can be controlled by providing a variable compression-ratio mechanism for varying the combustion chamber volume or by controlling the close timing of the intake valves.

Figure 12:
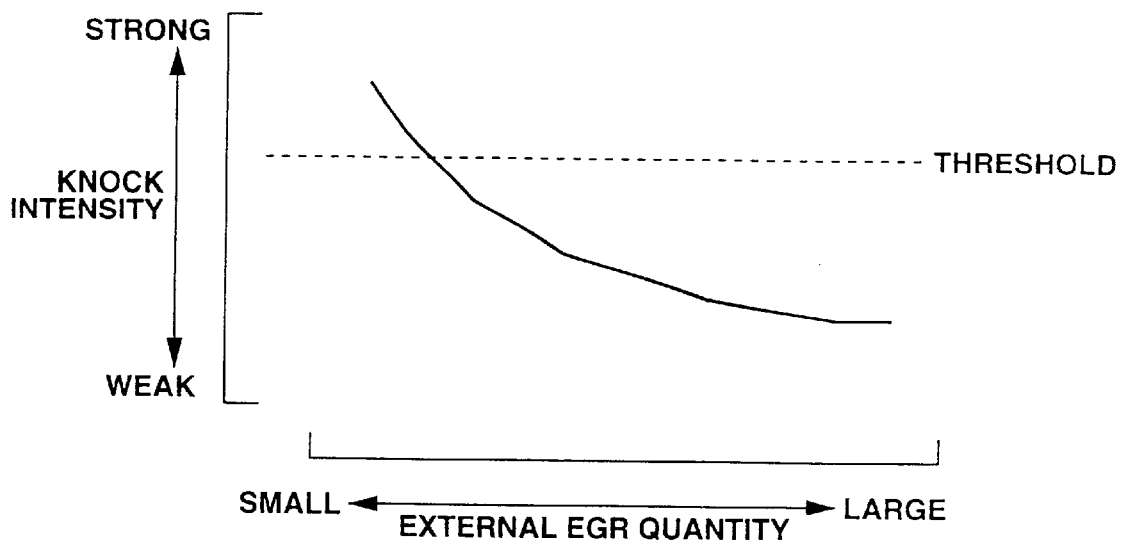
FIG. 12 is a graph showing a relationship between an external EGR quantity and the knock intensity.

FIG. 12 shows a relationship between the external EGR quantity and the knock intensity. The external EGR is low in temperature and includes a large quantity of inactive gas having a large specific rate. Therefore, as shown in FIG. 12, the knocking becomes strong according to the decrease of the external EGR quantity and becomes weak according to the increase of the external EGR quantity. Therefore, it is possible to control the combustion condition at the knocking limit by controlling the external EGR quantity. The external EGR quantity can be controlled by controlling the opening of the EGR valve.

Figure 13:
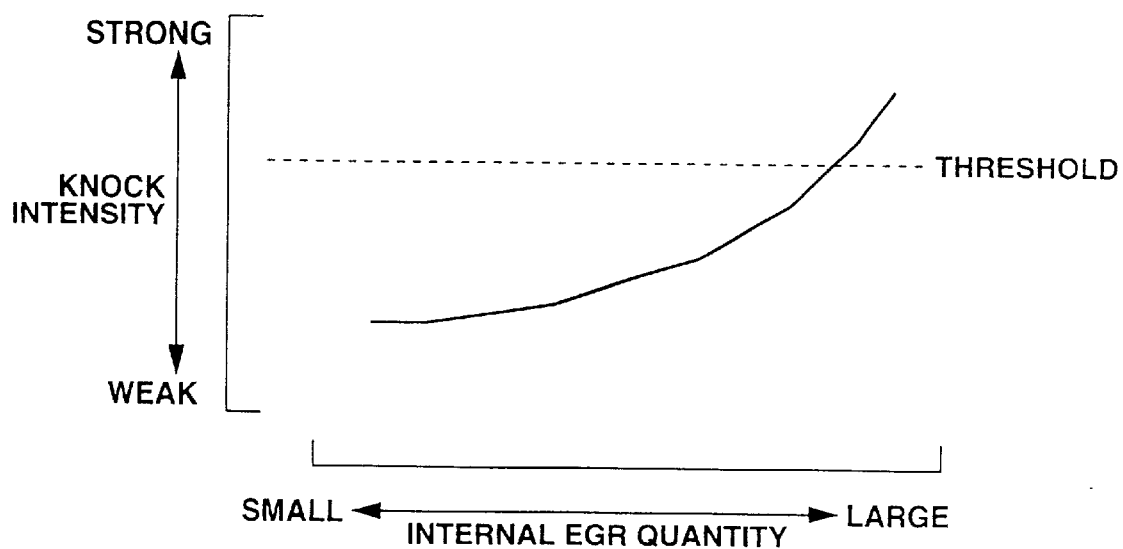
FIG. 13 is a graph showing a relationship between an internal EGR quantity and the knock intensity.

FIG. 13 shows a relationship between the internal EGR quantity and the knock intensity. The internal EGR is high in temperature. Therefore, as shown in FIG. 13, the knocking becomes strong according to the increase of the internal EGR quantity and becomes weak according to the decrease of the internal EGR quantity. Therefore, it is possible to control the combustion condition at the knocking limit by controlling the internal EGR quantity. The internal EGR quantity can be controlled by controlling the valve timing of the intake and exhaust valves. A concrete control method of the internal EGR quantity is commonly known and is disclosed in Japanese Patent Provisional Publication Nos. H11-132066 and 2000-64863.

Figure 14:
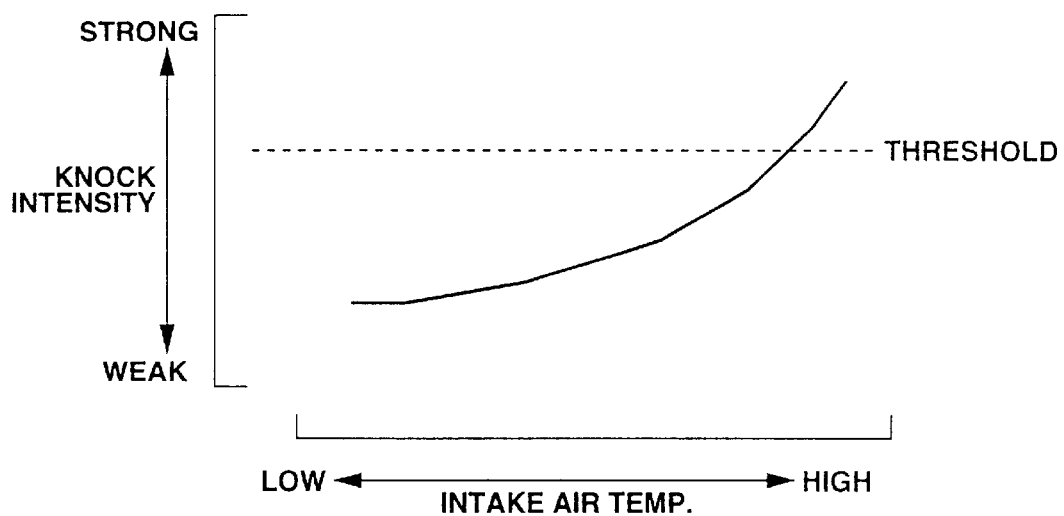
FIG. 14 is a graph showing a relationship between an intake air temperature and the knock intensity.

FIG. 14 shows a relationship between the intake air temperature and the knock intensity. As is clearly shown in FIG. 14, the knocking becomes strong according to the raising of the intake air temperature and becomes weak according to the dropping of the intake air temperature. Therefore, it is possible to control the combustion condition at the knocking limit by controlling the intake air temperature. The intake air temperature can be controlled by means of an intercooler or an intake air heating device.

Figure 15:
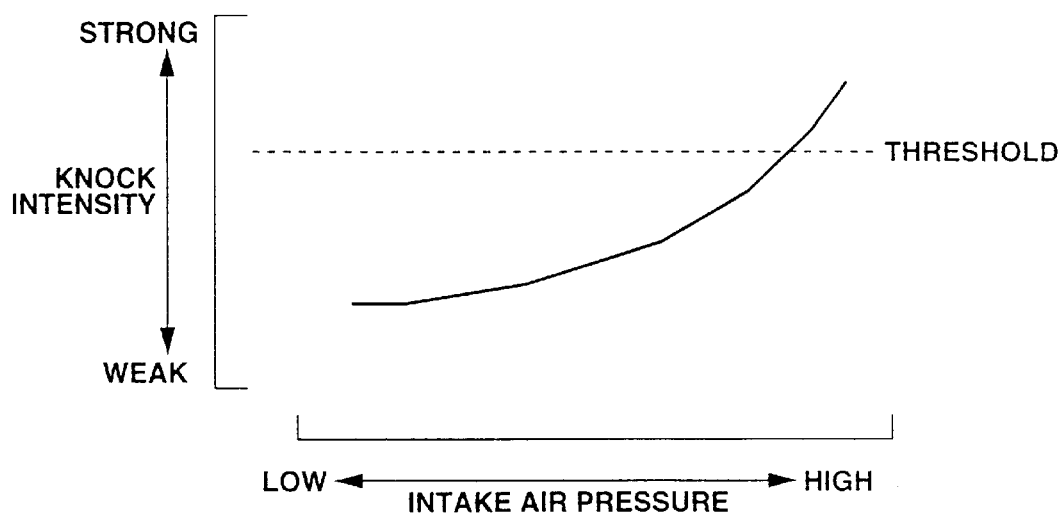
FIG. 15 is a graph showing a relationship between an intake air temperature and the knock intensity.

FIG. 15 shows a relationship between the intake air pressure and the knock intensity. As shown in FIG. 15, the knocking becomes strong according to the increase of the intake air pressure and becomes weak according to the decrease of the intake air pressure. Therefore, it is possible to control the combustion condition at the knocking limit by controlling the intake air pressure. The intake air pressure can be controlled by means of the throttle valve opening, a turbocharger or a supercharger.

Figure 16:
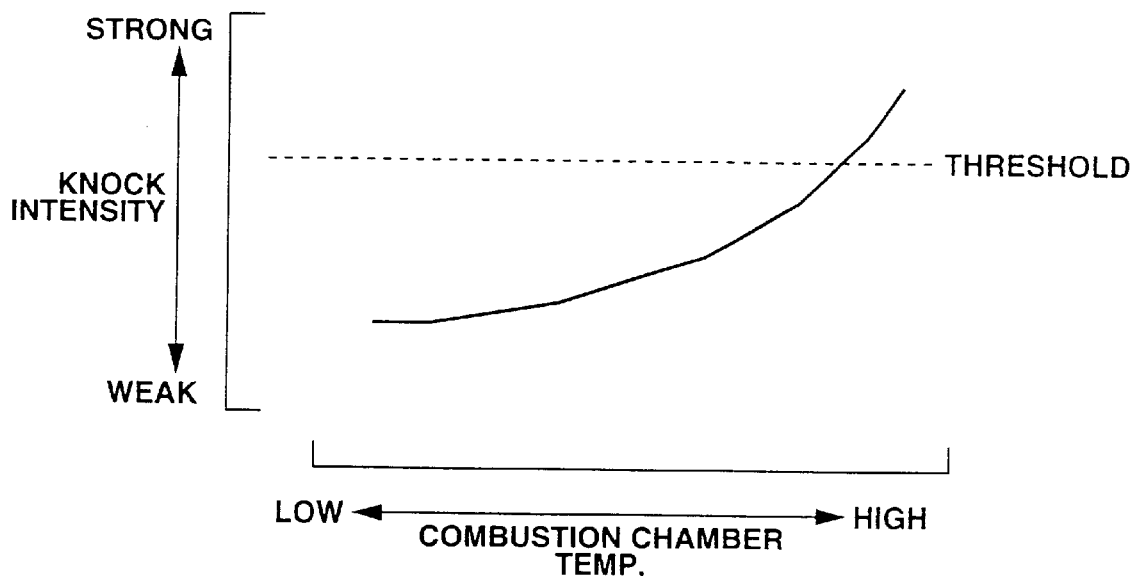
FIG. 16 is a graph showing a relationship between a combustion chamber temperature and the knock intensity.

FIG. 16 shows a relationship between the combustion chamber temperature and the knock intensity. As shown in FIG. 16, the knocking becomes strong according to the raising of the combustion chamber temperature and becomes weak according to the dropping of the combustion chamber temperature. Therefore, it is possible to control the combustion condition at the knocking limit by controlling the combustion chamber temperature. The combustion chamber temperature can be controlled by controlling the flow rate of the coolant of the engine.

Figure 17:
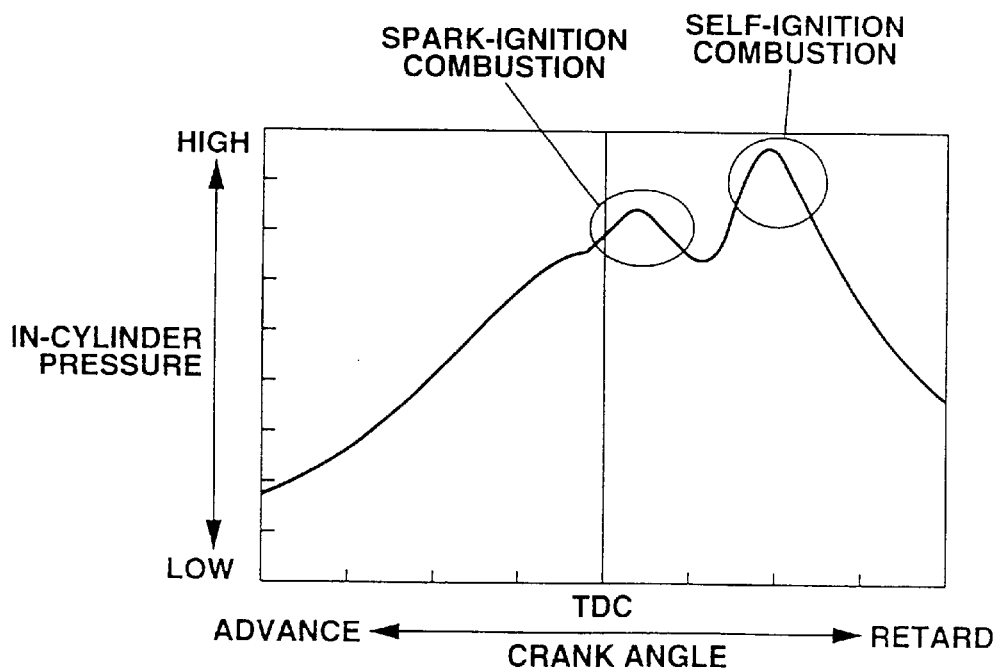
FIG. 17 is a graph showing a wave-form of an in-cylinder pressure of the self-ignition combustion partially employing a spark-ignition combustion.
Figure 18:
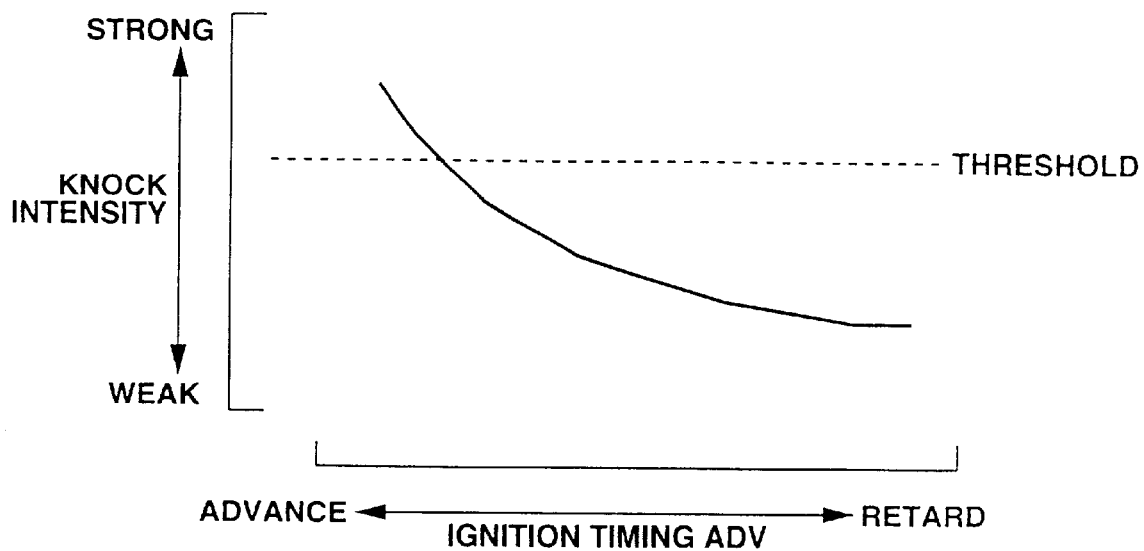
FIG. 18 is a graph showing a relationship between an ignition timing ADV and the knock intensity.

FIG. 17 shows a wave form representative of the in-cylinder pressure under the condition that the self-ignition combustion is executed while the spark-ignition combustion is partially executed. In this example, the self-ignition of the remaining fuel is executed by executing the spark-ignition as to a part of the fuel and by utilizing the combustion temperature and the pressure thereof. FIG. 18 shows the relationship between the ignition timing ADV and the knock intensity in the case shown in FIG. 17. As is clearly shown in FIG. 18, the knocking becomes strong by advancing the ignition timing and becomes weak by retarding the ignition timing. Therefore, it is possible to control the combustion condition at the knocking limit by controlling the ignition timing.

Figure 19:
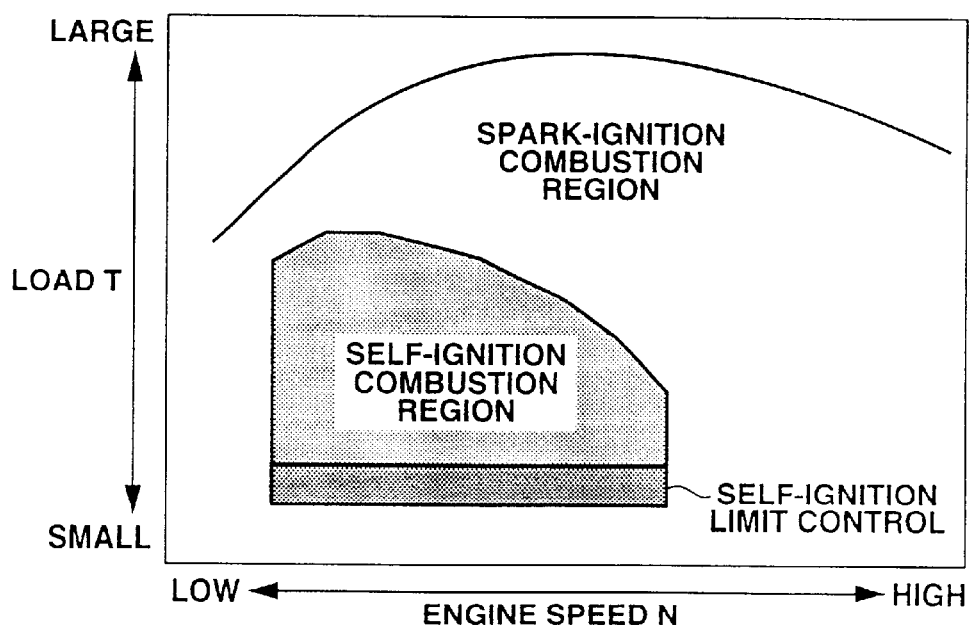
FIG. 19 is a graph showing the self-ignition limit control region of a second embodiment.

Next, a second embodiment according to the present invention will be discussed with reference to FIGS. 19 to 30. The construction of the compression self-ignition type gasoline engine according to the second embodiment of the present invention is the same as that of the first embodiment shown in FIGS. 1 and 2. The second embodiment is arranged to execute the self-ignition limit control in the low-load region of the self-ignition combustion region. FIG. 19 shows the region where the self-ignition limit control is executed. In this control, the self-ignition combustion limit is a stability limit in the low-load region.

Figure 20:
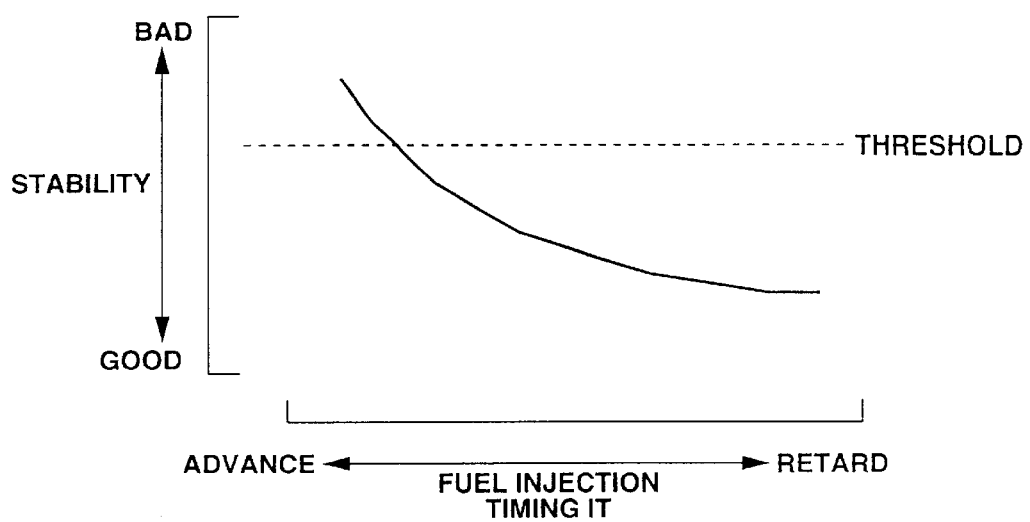
FIG. 20 is a graph showing a relationship between the fuel injection timing IT and stability of the combustion.

FIG. 20 shows a relationship between the fuel injection timing IT and the stability in the case that the fuel injection timing IT is employed as the combustion parameter. In the case that the fuel injection timing is set within the compression stroke, the stratification condition of the fuel is weaken according to the retard of the fuel ignition timing IT and therefore the stability is degraded by retarding the fuel injection timing IT. In reverse, the stratification condition of the fuel is promoted according to the advance of the fuel injection timing IT and therefore the stability is improved by advancing the fuel injection timing IT. Therefore, the combustion condition can be controlled at the stability limit by controlling the fuel ignition timing.

Further, under some engine operating conditions, the time necessary for starting the self-ignition is elongated by advancing the fuel ignition timing IT, and therefore the self-ignition tends to generate in such conditions. This will improve the stability. Under this situation, the control of the fuel ignition timing is inversely controlled as compared with the above-mentioned control manner.

Figure 21:
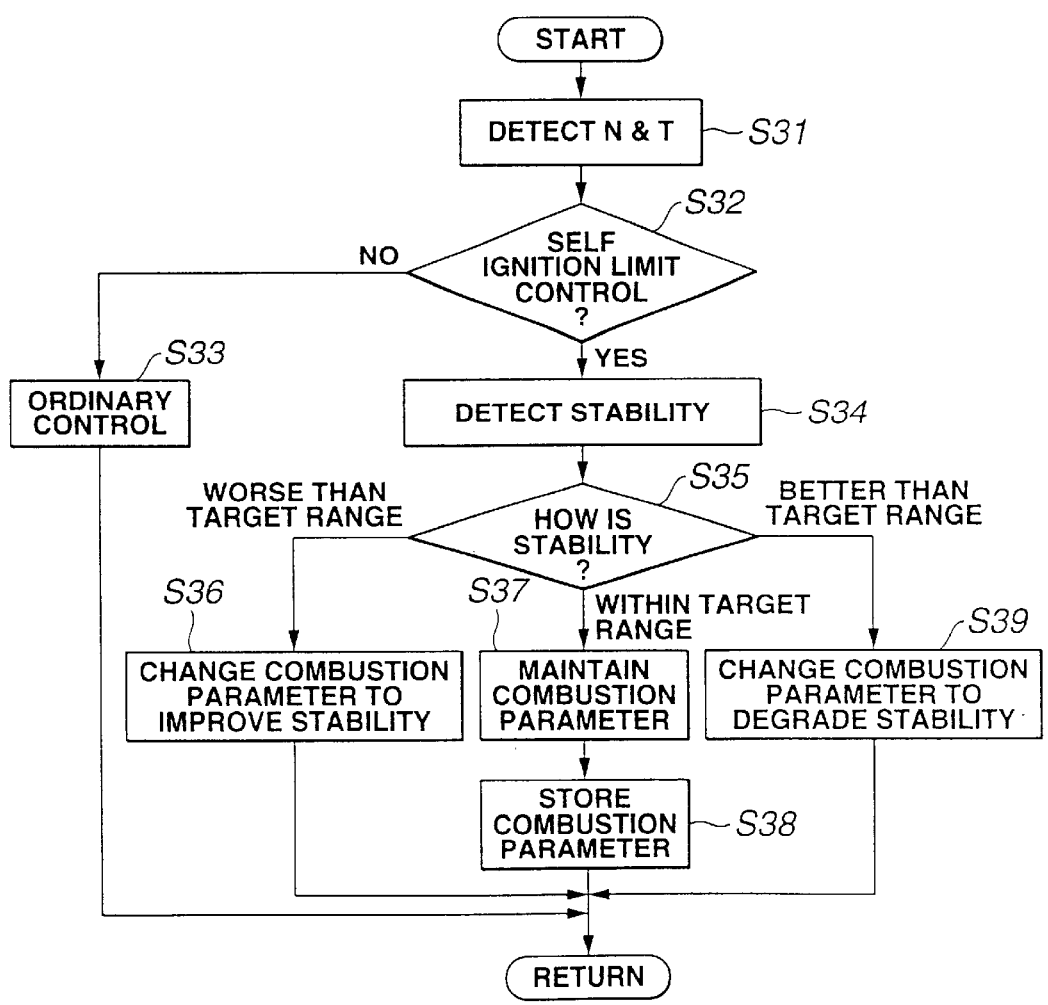
FIG. 21 is a flowchart of the self-ignition limit control of the second embodiment.
Figure 22:
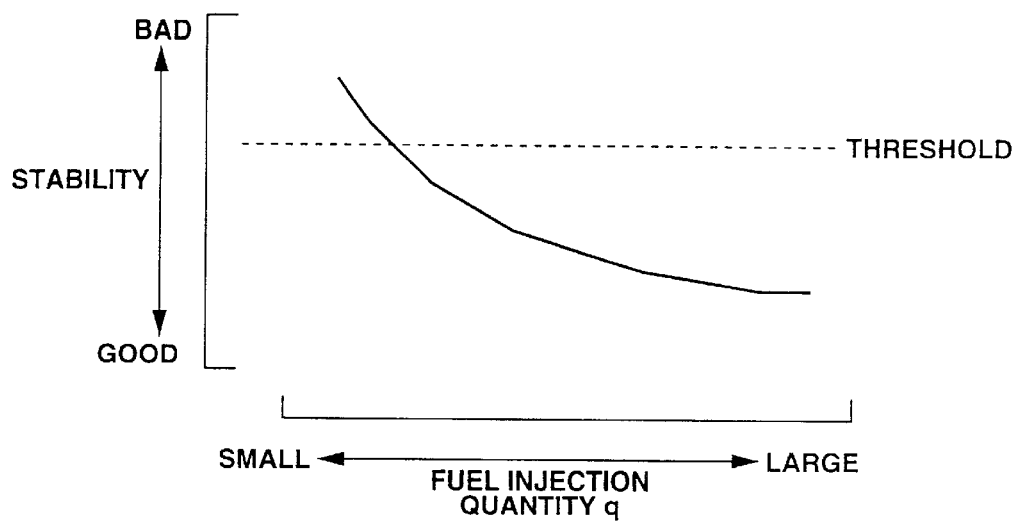
FIG. 22 is a graph showing a relationship between a fuel injection quantity q and the stability.
Figure 23:
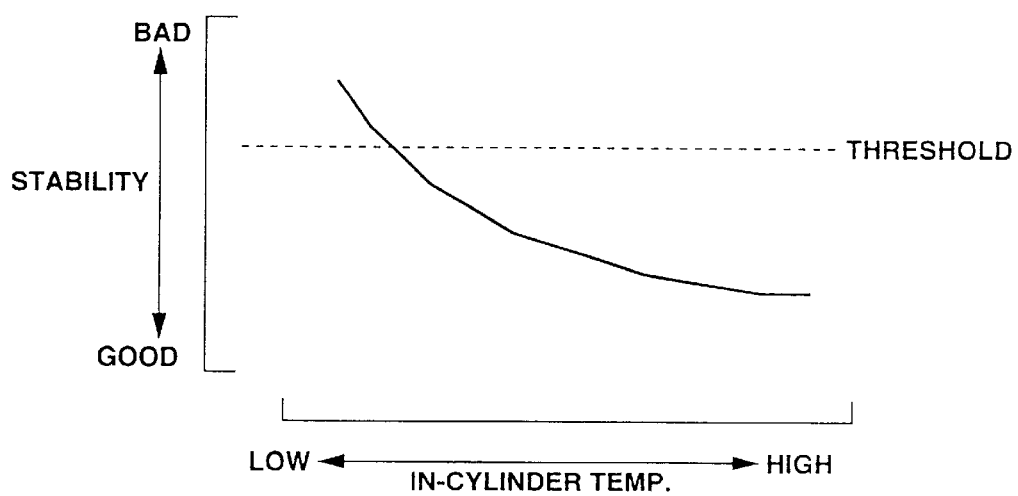
FIG. 23 is a graph showing a relationship between the in-cylinder temperature and stability.
Figure 24:
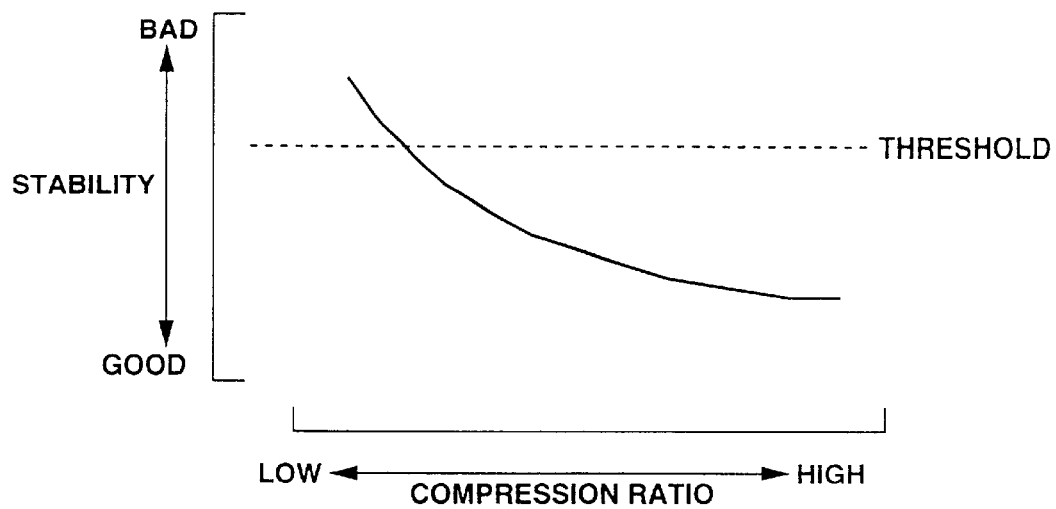
FIG. 24 is a graph showing a relationship between the compression ratio and the stability.
Figure 25:
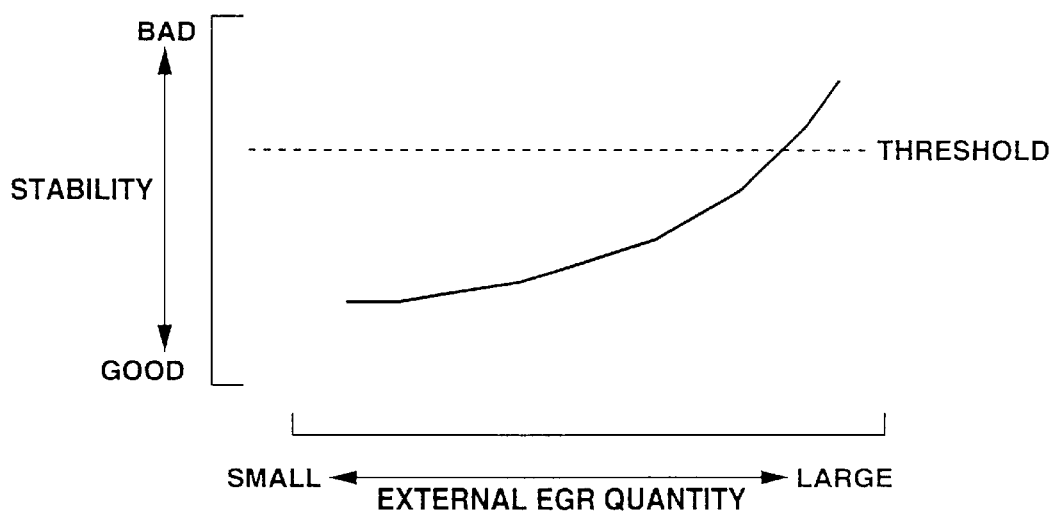
FIG. 25 is a graph showing a relationship between the external EGR quantity and the stability.
Figure 26:
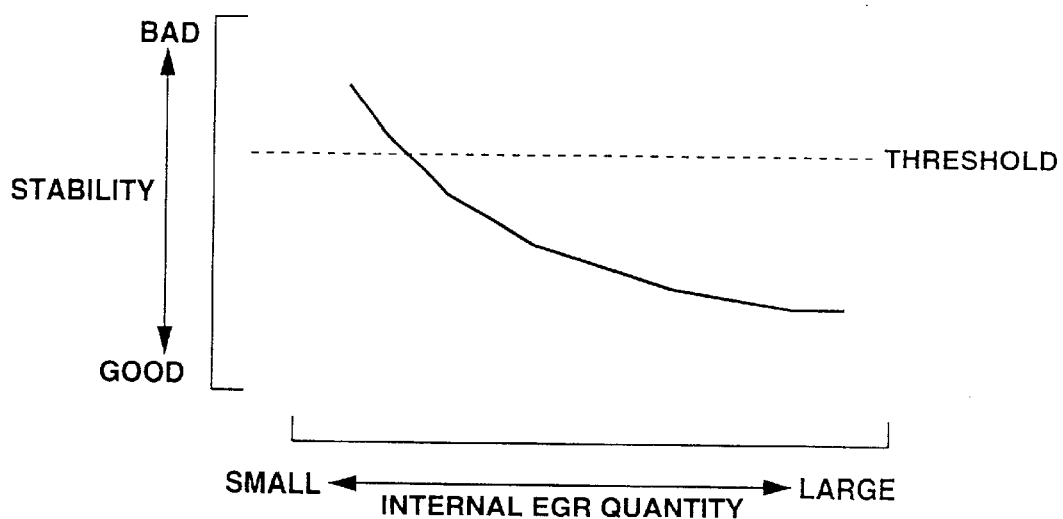
FIG. 26 is a graph showing a relationship between the internal EGR quantity fuel and the stability.
Figure 27:
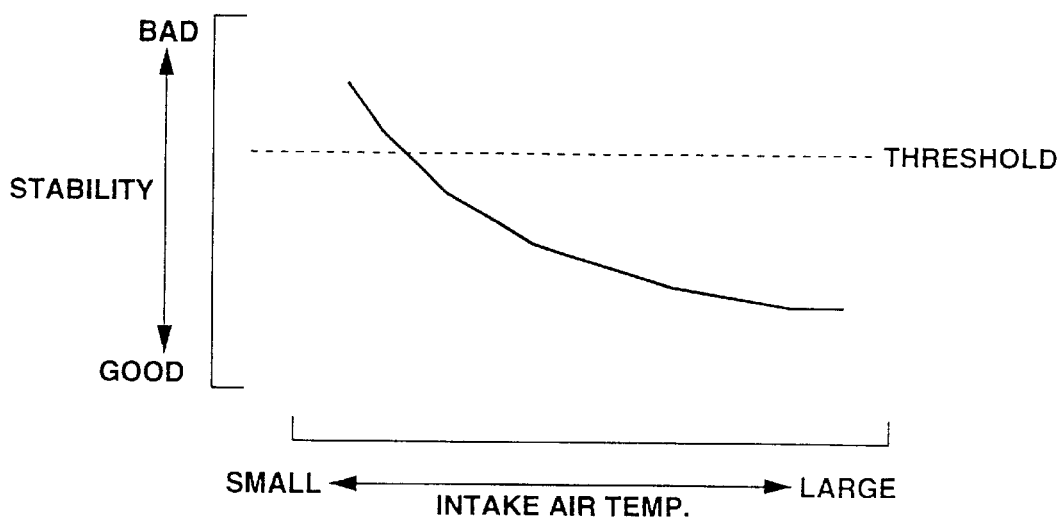
FIG. 27 is a graph showing a relationship between the intake air temperature fuel and the stability.
Figure 28:
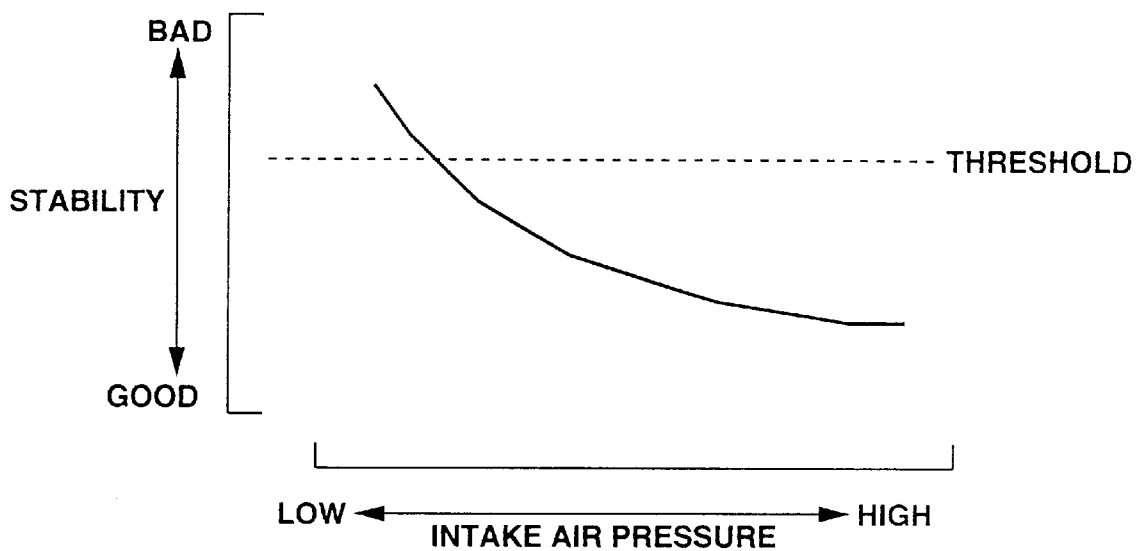
FIG. 28 is a graph showing a relationship between the intake air pressure and the stability.
Figure 29:
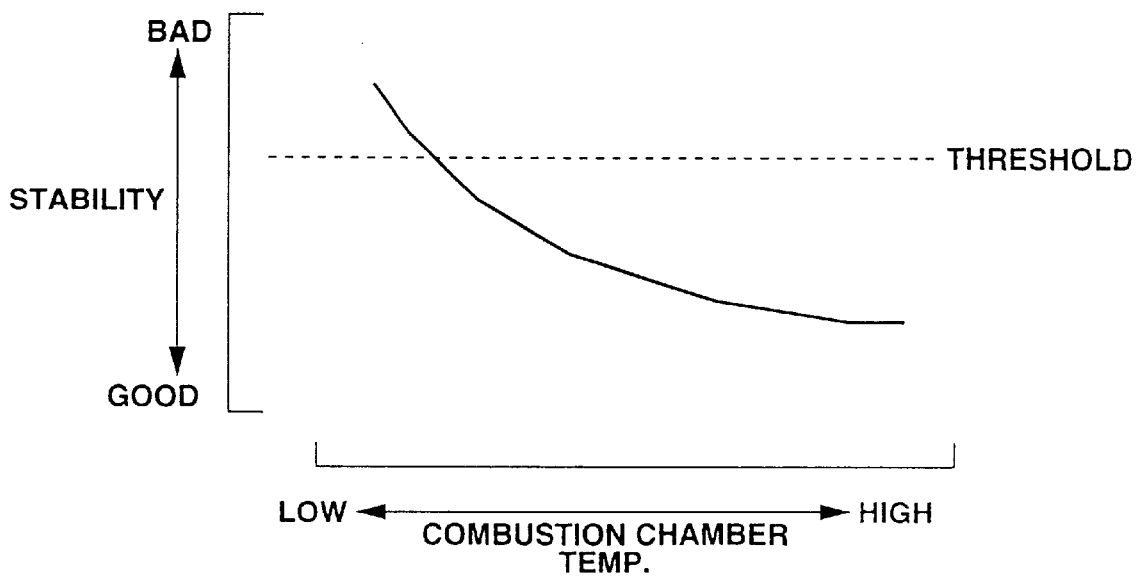
FIG. 29 is a graph showing a relationship between the combustion chamber temperature and the stability.
Figure 30:
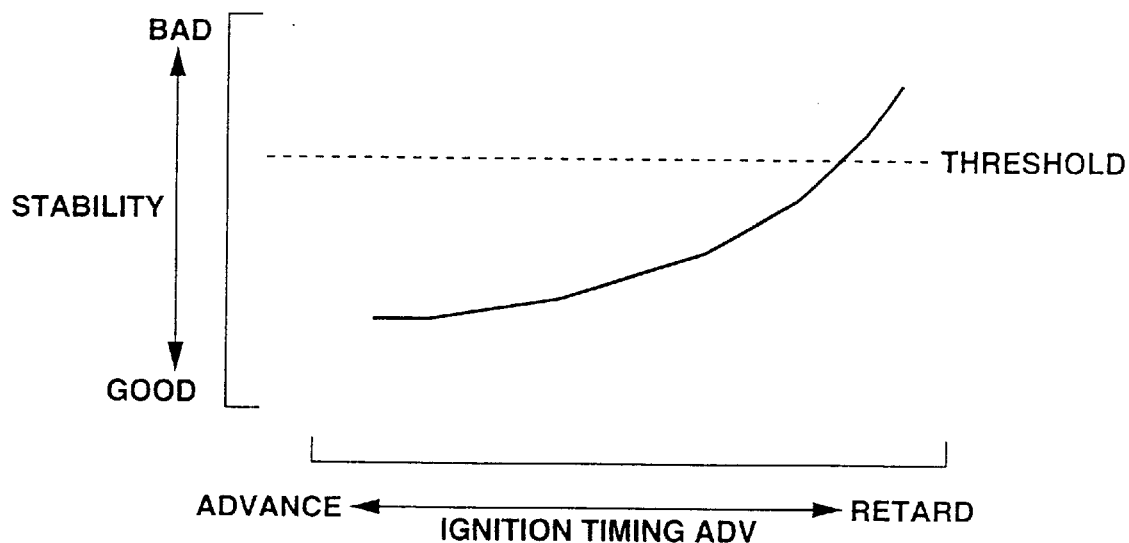
FIG. 30 is a graph showing a relationship between the ignition timing and the stability.

FIG. 21 shows a control flowchart of the second embodiment. This flowchart is basically the same as that of the first embodiment shown in FIG. 8 except for several steps. Therefore, the different steps from those of the first embodiment will be discussed. Only steps S34 and S35 are different from steps S24 and S25 of the first embodiment. The other steps S31–S33, S37 and S38 are basically the same as steps S21–23, S27 and S28, and therefore the explanation thereof is omitted herein.

At step S34, ECU 3 detects the stability of the combustion in each cylinder. At step S35 following to the execution of step S34, ECU 3 decides whether the stability is better than or worse than or within a target range. When ECU 3 decides the stability is worse than the target range, the routine proceeds to step S36 wherein ECU 3 varies the combustion parameter so as to improve the stability. When ECU 3 decides the stability is better than the target range, the routine proceeds to step S39 wherein ECU 3 varies the combustion parameter so as to degrade the stability. When ECU 3 decides the stability is within the target range, the routine proceeds to step S37 wherein ECU 3 maintains the combustion parameter. At step S38 following to step S37, ECU 3 stores the combustion parameter.

By executing the above-mentioned control, even when the engine is degraded by aging or even when product dispersion as to the engine is generated, the control system according to the present invention can execute the self-ignition combustion without degrading the stability.

FIGS. 22 to 30 shows the control direction in the case that the combustion parameter is selected from the fuel injection quantity, the in-cylinder temperature, the compression ratio, the external EGR quantity, the internal EGR quantity, the intake air temperature, the intake air pressure, the combustion chamber wall temperature and the ignition timing, as are similar to FIGS. 9–16 and 18.

Next, a third embodiment according to the present invention will be discussed with reference to FIGS. 31 and 32. The construction of the compression self-ignition type gasoline engine according to the third embodiment of the present invention is the same as that of the first embodiment shown in FIGS. 1 and 2. The third embodiment is arranged to execute the self-ignition limit control in the low-load and the high-load regions of the self-ignition combustion region. In this control, the self-ignition combustion limit is a stability limit in the low-load region, and is the knocking limit in the high-load region.

Figure 31:
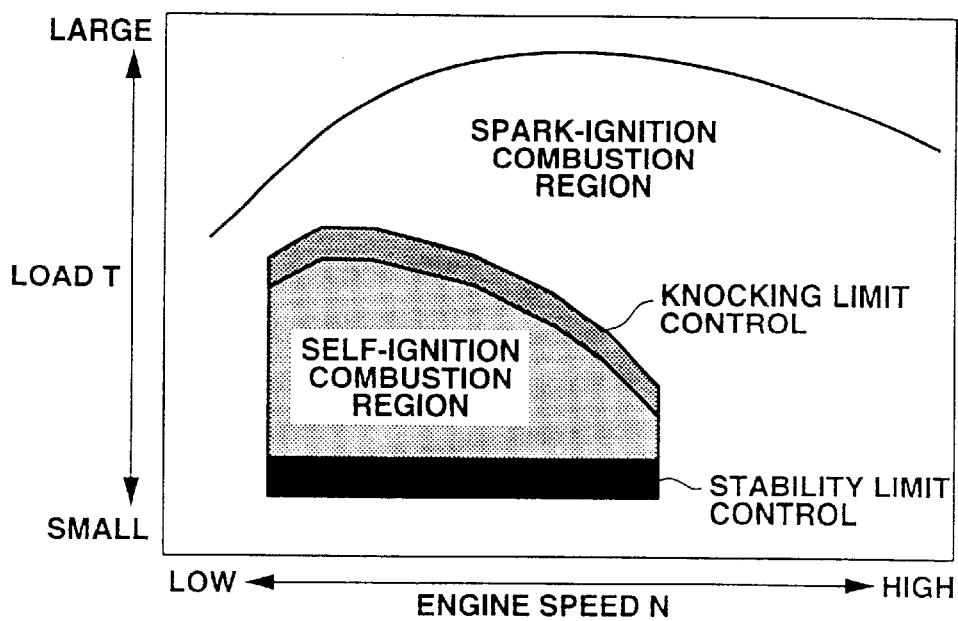
FIG. 31 is a graph showing the self-ignition limit control region of a third embodiment.

FIG. 31 shows the self-ignition limit control region where the self-ignition limit control of the third embodiment is executed. In the operation of the third embodiment, the stability limit control is executed in the low-load region of the self-ignition control region, and the knocking limit control is executed in the high-load region of the self-ignition control region.

Figure 32:
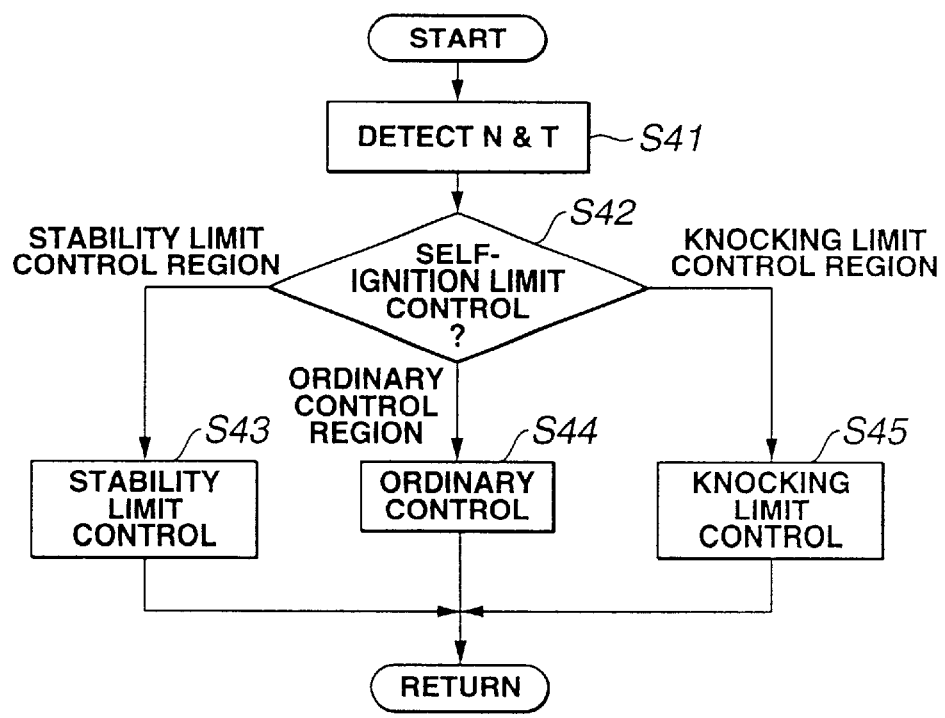
FIG. 32 is a flowchart of the self-ignition limit control of the third embodiment.

FIG. 32 shows a control flowchart for executing the self-ignition limit control of the third embodiment. At step S41, ECU 3 detects the engine speed N and the load T of the engine. At step S42, ECU 3 decides whether the combustion condition is in knocking limit control region or stability limit control region of the self-ignition combustion region, or in ordinary control region. When ECU 3 decides at step S42 that the combustion condition is set in the stability limit control region, the routine proceeds to step S43 wherein the stability limit control is started. When ECU 3 decides at step S42 that the combustion condition is set in the ordinary control region, the routine proceeds to step S44 wherein the ordinary control is executed. When ECU 3 decides at step S42 that the combustion condition is set in the knocking limit control region, the routine proceeds to step S45 wherein the knocking limit control is started. The concrete methods of the stability limit control and the knocking limit control are the same as those in the first and second embodiments.

Next, a fourth embodiment according to the present invention will be discussed with reference to FIGS. 33 to 36. The construction of the compression self-ignition type gasoline engine according to the fourth embodiment of the present invention is the same as that of the first embodiment shown in FIGS. 1 and 2. The fourth embodiment is arranged to execute the self-ignition limit control in the whole of the self-ignition combustion region. In this control, the self-ignition combustion limit is a stability limit in the low-load region, and is the knocking limit in the intermediate or high-load region.

Figure 33:
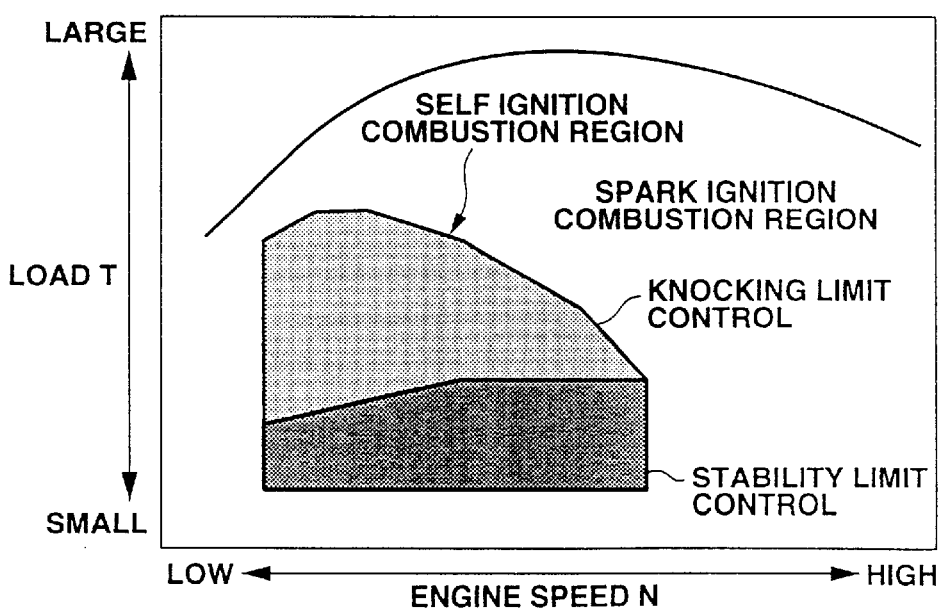
FIG. 33 is a graph showing the self-ignition limit control region of a fourth embodiment.

FIG. 33 shows the self-ignition limit control region where the self-ignition limit control of the fourth embodiment is executed. In the operation of the fourth embodiment, the stability limit control is executed in the low-load region of the self-ignition control region, and the knocking limit control is executed in the intermediate-load or high-load region of the self-ignition control region. Under the intermediate or high load condition, the engine generates mechanical sound loudly. Therefore, the combustion sound generated by the self-ignition combustion sounds weak under the intermediate or high load condition, as compared with the mechanical sound generated.

Figure 34:
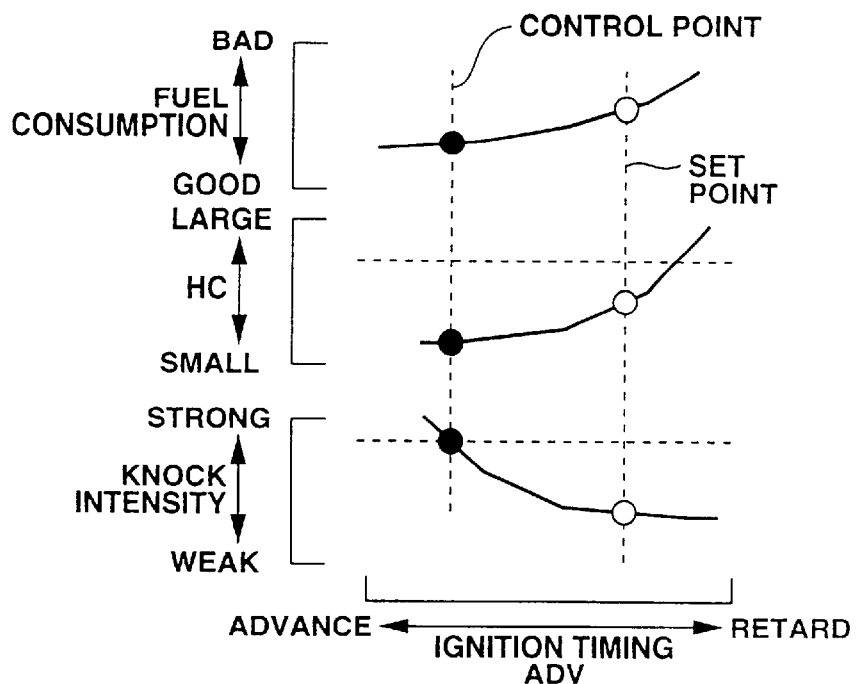
FIG. 34 is a graph showing relationships of a fuel consumption, hydrocarbon HC and the knock intensity relative to the ignition timing ADV.

FIG. 34 shows the fuel consumption, the hydrocarbon HC and the knock intensity relative to the ignition timing ADV during the intermediate or high load condition. If the ignition timing ADV is advanced with respect to the set point taking account of the product dispersion and the aging of the engine, the combustion timing is advanced. Thereby, although the knocking becomes strong, HC is decreased and the fuel consumption is improved. Therefore, during the intermediate or high load condition where it is not important to take account of the combustion sound, the knocking limit control is executed to improve the fuel consumption and HC performance. On the other hand, under the low load condition, the mechanical noise of the engine is weak. Therefore, if the sound level of the combustion noise increases, it sounds loudly under the low load condition.

Figure 35:
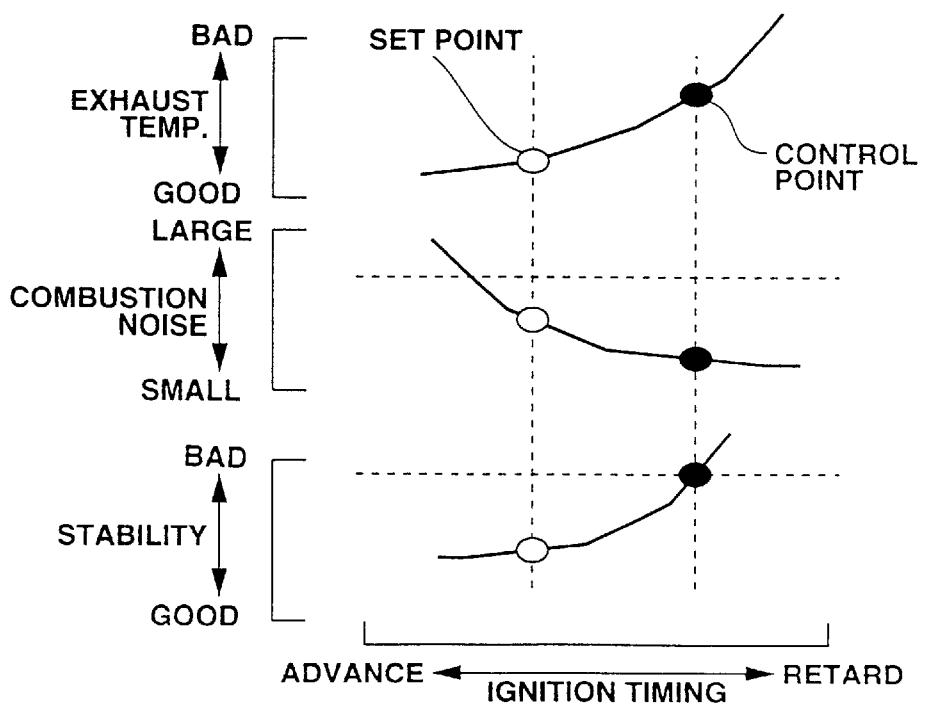
FIG. 35 is a graph showing relationships of an exhaust gas temperature, combustion noise and the stability relative to the ignition timing.

FIG. 35 shows the exhaust gas temperature, the combustion sound and the stability relative to the ignition timing ADV under the low load condition. If the ignition timing ADV is retarded with respect to the set point taking account of the product dispersion and the aging of the engine, the combustion timing is retarded. Thereby, although the knocking becomes strong, the combustion sound is decreased in noise level and the exhaust gas temperature is raised up. Therefore, under the low load condition where it is important to take account of the combustion sound, the stability limit control is executed to improve the combustion noise. Further, since the exhaust gas temperature is also dropped under the low load condition, the stability limit control is effectively executed to raise the exhaust gas temperature and to improve the conversion ratio of the catalyst. This contributes the exhaust emission to be reduced.

Figure 36:
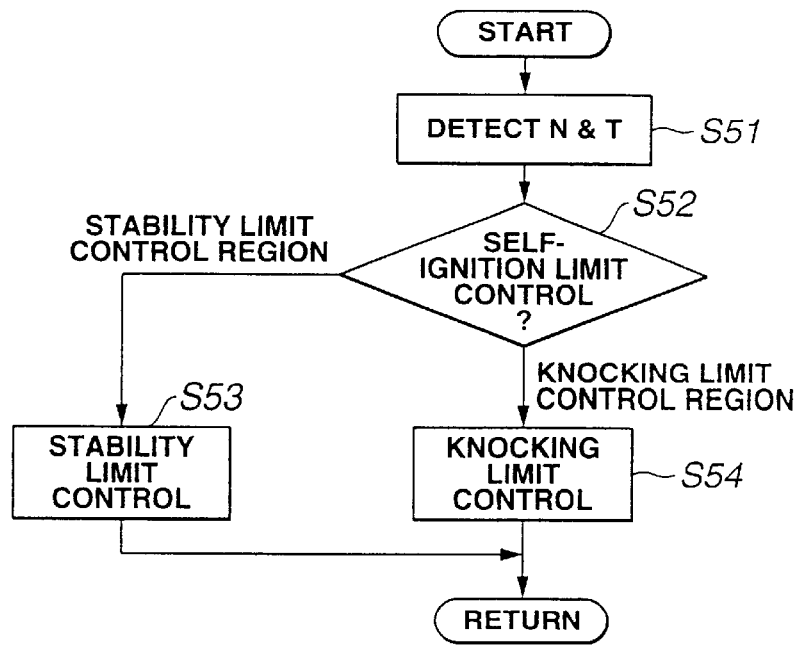
FIG. 36 is a flowchart of the self-ignition limit control of a fourth embodiment.

FIG. 36 shows a control flow executed in the fourth embodiment. At step S51, ECU 3 detects the engine speed N and the load T of the engine. At step S52, ECU 3 decides whether the combustion condition is in knocking limit control region or stability limit control region of the self-ignition combustion region. When ECU 3 decides at step S52 that the combustion condition is set in the stability limit control region, the routine proceeds to step S53 wherein the stability limit control is started. When ECU 3 decides at step S52 that the combustion condition is set in the knocking limit control region, the routine proceeds to step S44 wherein the knocking limit control is executed. The concrete methods of the stability limit control and the knocking limit control are the same as those in the first and second embodiments.

Figure 37:
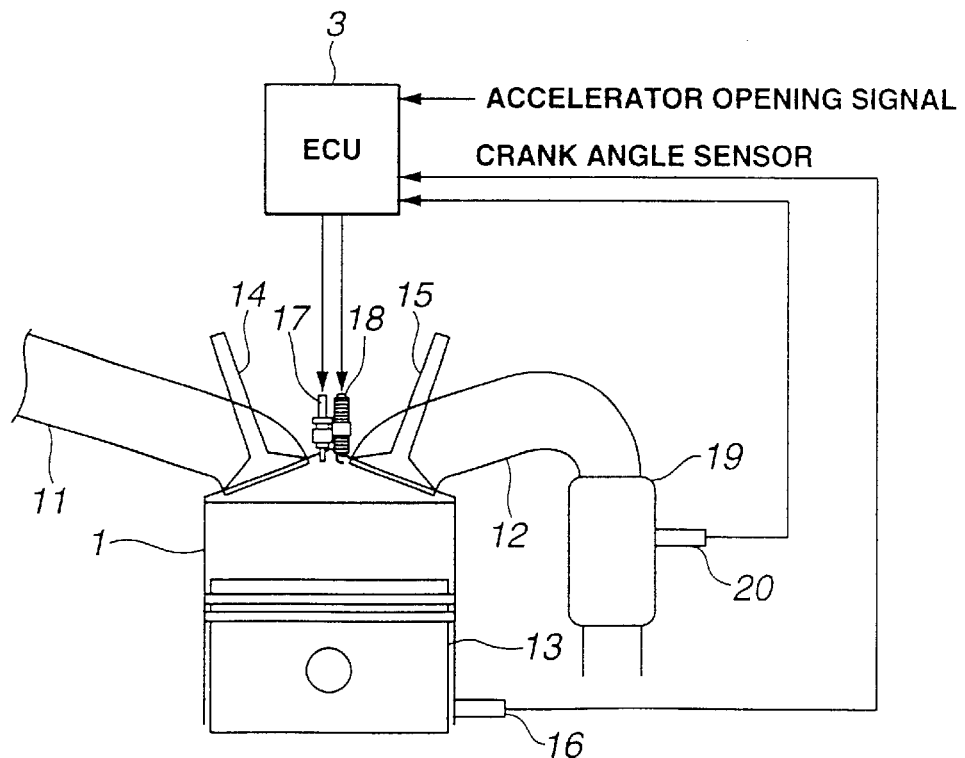
FIG. 37 is a schematic view of the engine according to the sixth embodiment.

Next, a fifth embodiment according to the present invention will be discussed with reference to FIGS. 37 to 39. The system construction of the compression self-ignition type gasoline engine according to the fourth embodiment of the present invention is the same as that of the first embodiment shown in FIG. 1. FIG. 37 shows a hardware construction of the fifth embodiment. The hardware construction of the fifth embodiment further comprises an exhaust emission control catalyst 19 and a catalyst temperature sensor 20 in addition to the hardware construction of the first embodiment shown in FIG. 2.

The fifth embodiment is arranged to change the method of the self-ignition limit control according to the activated condition of catalyst 19.

Since the self-ignition combustion performs a high thermal efficiency, the exhaust gas temperature under this self-ignition combustion is low. Particularly, under the low load condition, the temperature is low.

Figure 39:
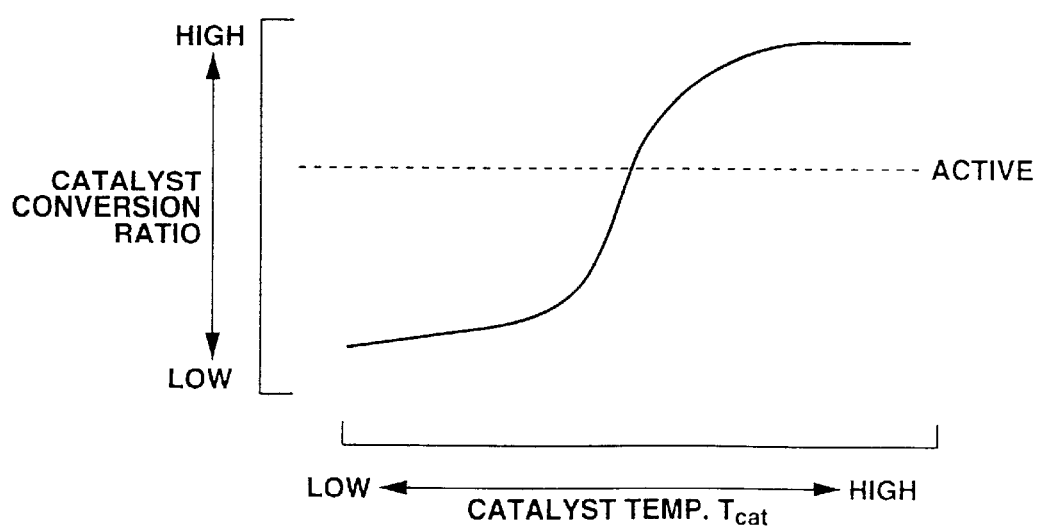
FIG. 39 is a graph showing a relationship between a catalyst temperature and a catalyst conversion ratio.

FIG. 39 shows a relationship between a catalyst temperature $T_{cat}$ and the conversion ratio. The conversion ratio of catalyst 19 degrades according to the dropping of the catalyst temperature. Accordingly, if the self-ignition combustion under the low load condition is continued, the catalyst temperature is continued to drop, and therefore the conversion ratio will degrade by this temperature drop.

Therefore, the fifth embodiment is arranged to detect the activity of catalyst 19 and to raise the exhaust gas temperature when catalyst 19 is not active. As explained as to the FIG. 35 in the fourth embodiment, by executing the stability limit control, the exhaust temperature is raised. Therefore, the fifth embodiment is arranged to execute the stability limit control when the temperature of catalyst 19 becomes lower than a predetermined temperature, regardless the engine operating condition.

Figure 38:
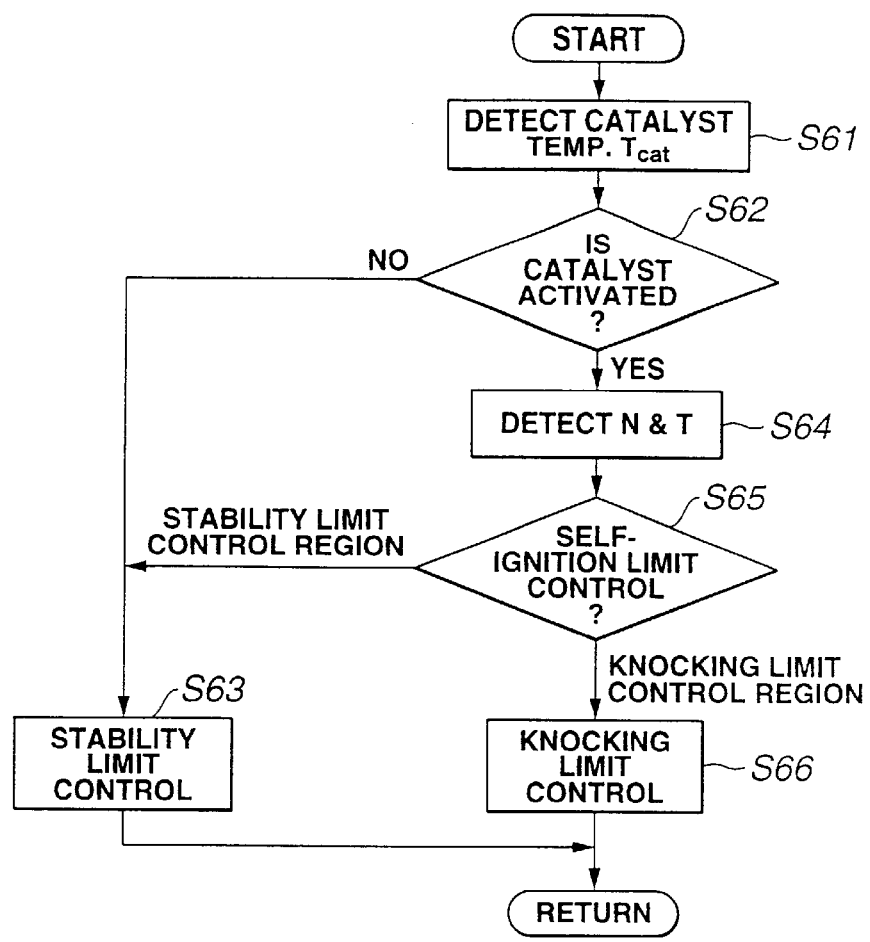
FIG. 38 is a flowchart of the self-ignition limit control of a fifth embodiment.

FIG. 38 shows a flowchart of the control executed by the fifth embodiment. The control of the fifth embodiment is generally similar to that of the fourth embodiment shown in FIG. 36. As to the different steps, the explanation will be done. At step S61, ECU 3 detects the catalyst temperature $T_{cat}$. At step S62, ECU 3 decides whether or not the catalyst 19 is activated, on the basis of a map shown in FIG. 39 where a relationship between the catalyst temperature $T_{cat}$ and the catalyst conversion ratio are shown. When the decision at step S62 is negative, the routine proceeds to step S63 wherein the stability limit control is executed. When the decision at step S62 is affirmative, the routine proceeds to step S64 corresponding to step S51 in FIG. 36 to execute the control as same as that of the fourth embodiment. That is, steps S64–S66 and S63 correspond to steps S51, S52, S53 and S54, respectively.

Next, a sixth embodiment according to the present invention will be discussed with reference to FIGS. 40 and 41. The sixth embodiment is arranged to execute the self-ignition limit control by each cylinder.

Figure 40:
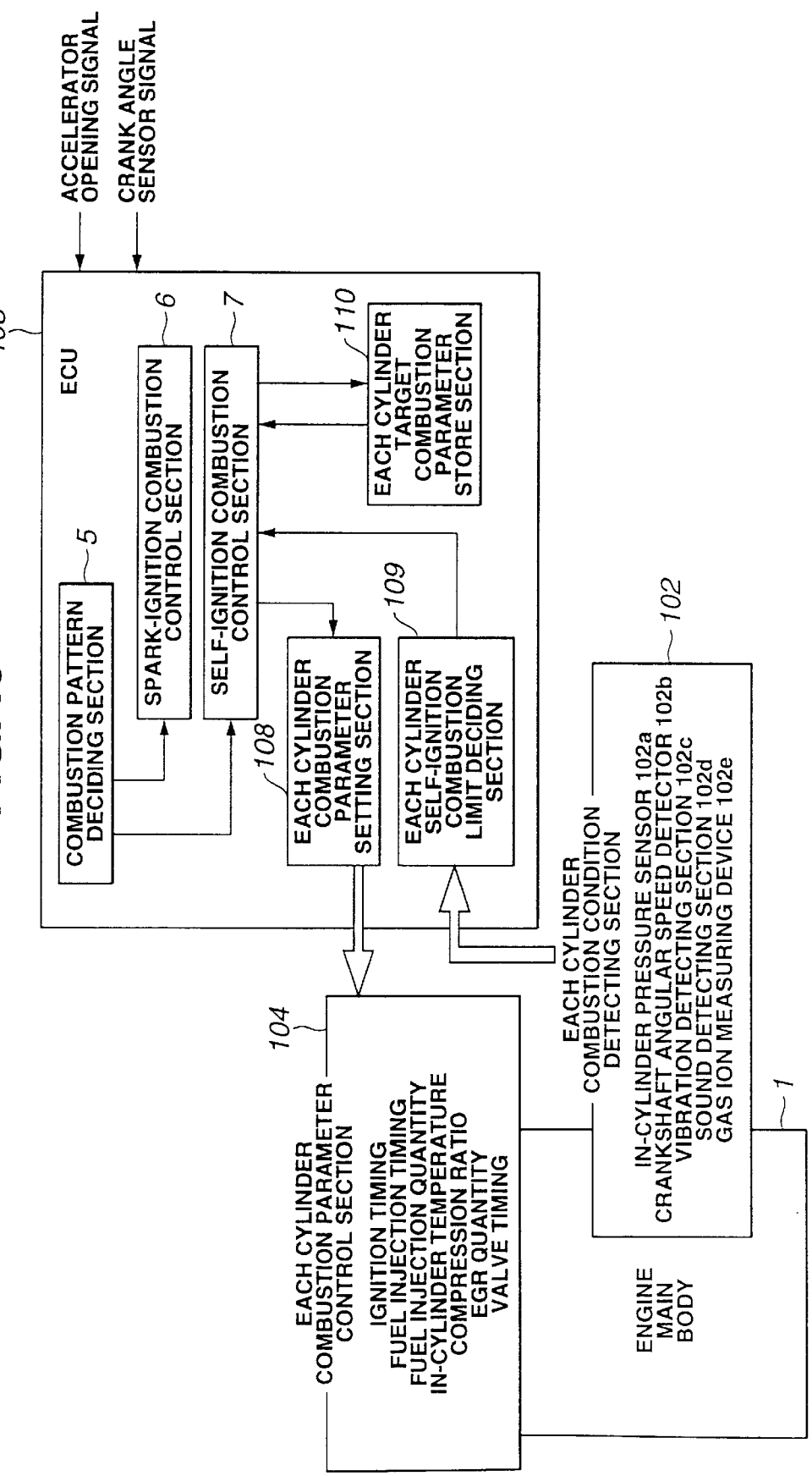
FIG. 40 is a system view of a sixth embodiment of a compression self-ignition type gasoline engine according to the present invention.

FIG. 40 shows a system construction of a compression self-ignition type gasoline engine according to the sixth embodiment of the present invention. The system construction of the sixth embodiment is basically similar to that of the first embodiment shown in FIG. 1. The internal combustion engine of the sixth embodiment comprises engine main body 1, each-cylinder combustion condition detecting section 102, an engine control unit (ECU) 103 and an each-cylinder combustion parameter control section 104.

ECU 103 comprises the combustion pattern deciding section 5 for deciding a combustion pattern from the accelerator opening and the crank angle sensor signal, the spark-ignition combustion control section 6 for controlling the engine during the spark-ignition combustion, the self-ignition combustion control section 7 for controlling the engine during the self-ignition combustion, an each-cylinder combustion parameter setting section 108 for setting each combustion parameter of each cylinder during the self-ignition combustion, an each-cylinder self-ignition combustion limit deciding section 109 for deciding whether each cylinder is put in the self-ignition combustion limit by deciding the signal level of the sensor output signals in the each-cylinder combustion condition detecting section 102, and an each-cylinder target combustion parameter storage section 110 for storing the set value of the combustion parameter of each cylinder during the self-ignition combustion limit.

Each-cylinder combustion condition detecting section 102 is constituted by at least one of an in-cylinder pressure sensor, a crankshaft angular speed detecting section, a vibration detecting section, a sound detecting section and a combustion gas ion measuring device.

Each-cylinder combustion parameter control section 104 employs at least one of ignition timing, fuel injection timing, fuel injection quantity, in-cylinder temperature, compression ratio, EGR quantity as a combustion parameter by each cylinder.

Figure 41:
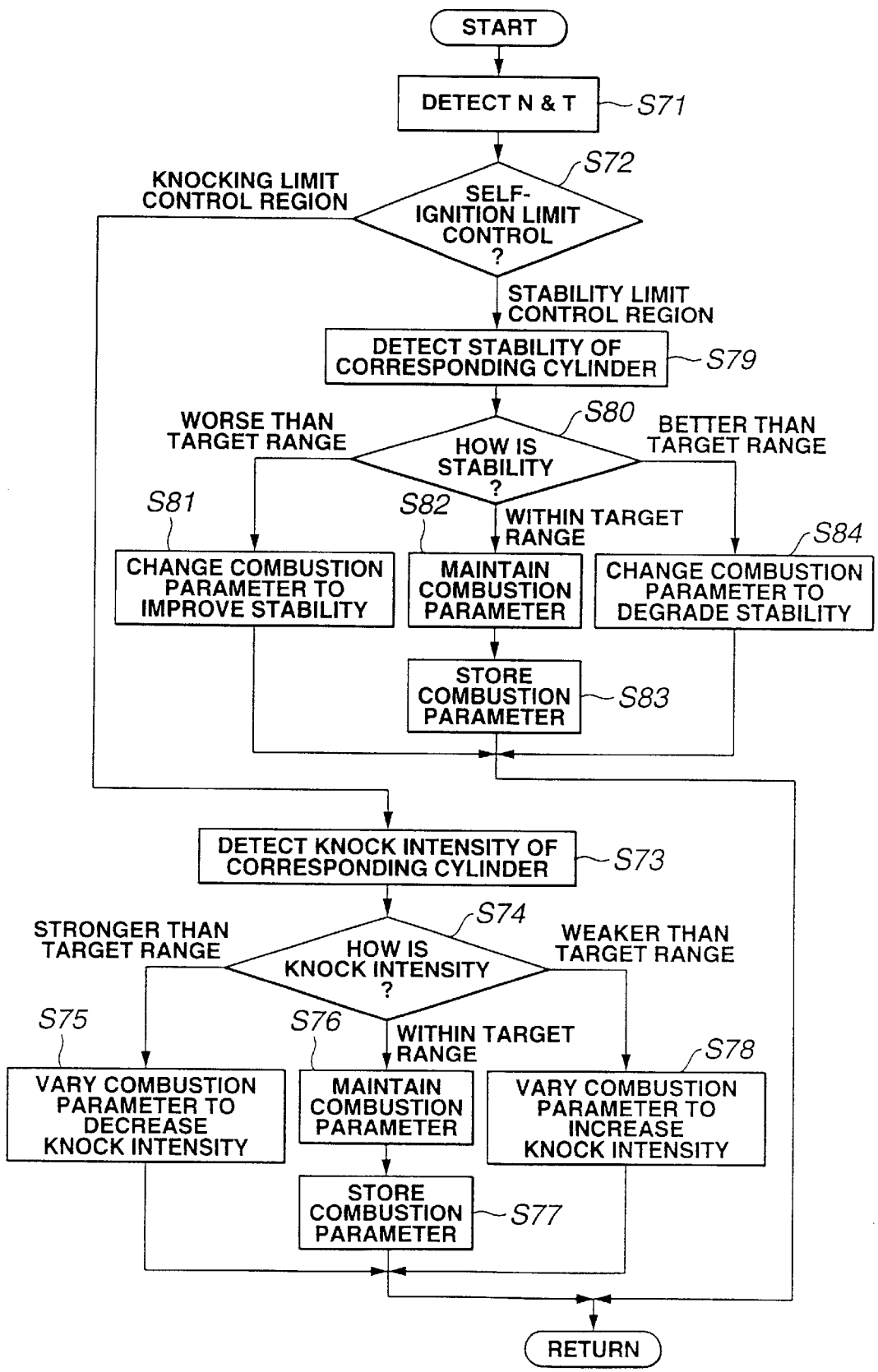
FIG. 41 is a flowchart showing the self-ignition limit control of the sixth embodiment.

FIG. 41 shows a flowchart of the control executed in the sixth embodiment. The control flow of the sixth embodiment is similar to those of the first to fourth embodiments. The control shown in FIG. 41 is executed by each cylinder. Only specific steps will be discussed. At step S73, ECU 103 detects the knock intensity by each cylinder. At step S77, ECU 103 stores the combustion parameter for each cylinder (corresponding cylinder). At step S83, ECU 103 stores the combustion parameter of the corresponding cylinder.

With the thus control, even when the combustions are dispersed between the cylinders due to the product dispersion, it is possible to prevent the knocking at the specific cylinder from being generated and the stability from being degraded. Further, even if the aging is different by each cylinder, it is possible to prevent the knocking at the specific cylinder from being generated and the stability from being degraded.

Next, a seventh embodiment according to the present invention will be discussed with reference to FIGS. 42 to 47. The seventh embodiment is arranged to decide the self-ignition combustion limit and vary the set value of the combustion parameter when the combustion condition is in the combustion limit deciding region which is a special region provided in the self-ignition combustion region.

Figure 42:
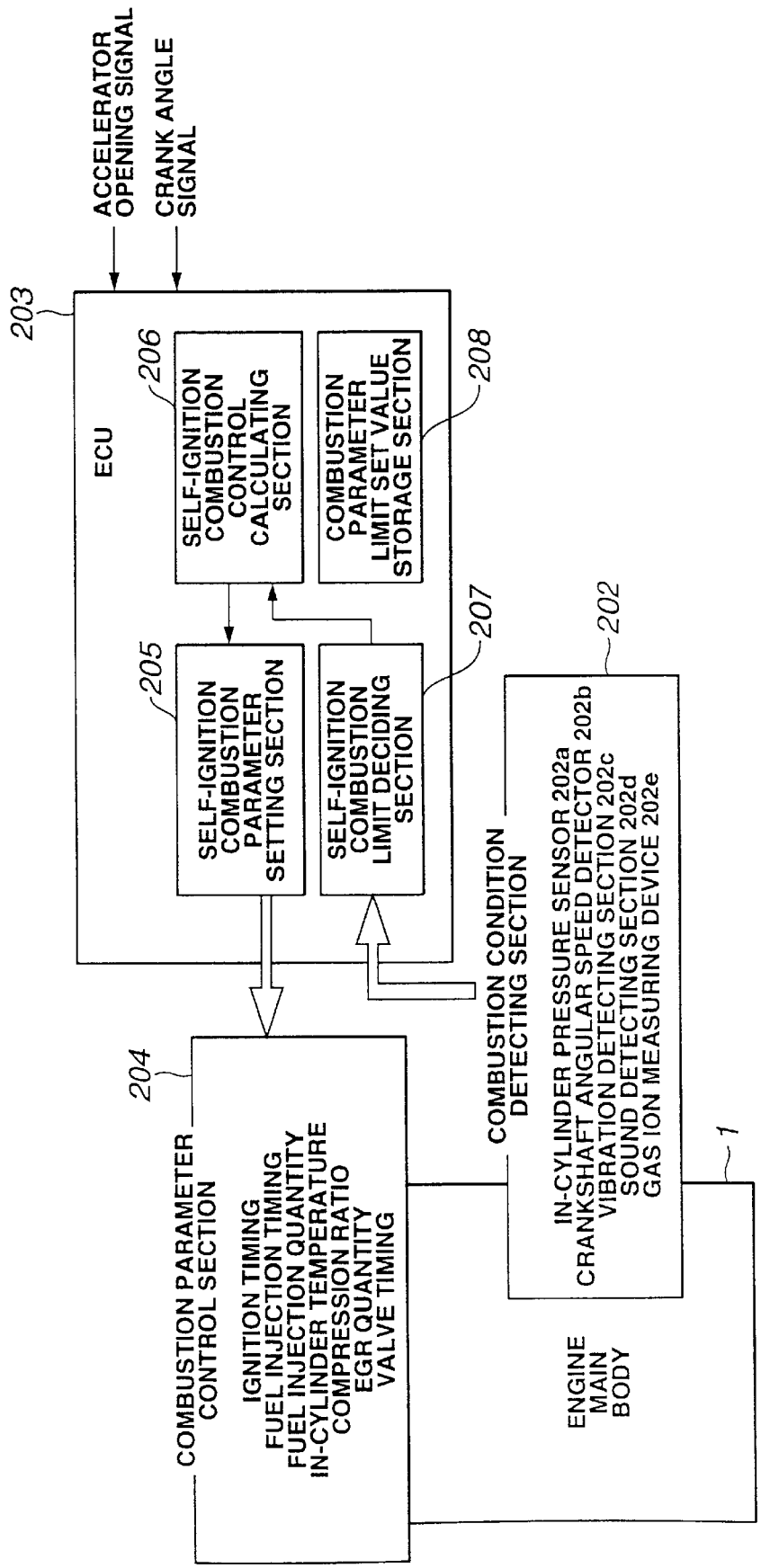
FIG. 42 is a system view of a seventh embodiment of a compression self-ignition type gasoline engine according to the present invention.

FIG. 42 shows a system construction of a compression self-ignition type gasoline engine according to the seventh embodiment of the present invention. The system construction of the seventh embodiment is generally similar to that of the first embodiment shown in FIG. 1. The internal combustion engine of the seventh embodiment comprises engine main body 1, a combustion condition detecting section 202, an engine control unit (ECU) 203 and a combustion parameter control section 204.

ECU 203 comprises a self-ignition combustion parameter setting section 205, a self-ignition combustion control calculating section 206, a self-ignition combustion limit deciding section 207 and a combustion parameter limit set value storage section 208.

Combustion condition detecting section 202 is constituted by at least one of an in-cylinder pressure sensor, a crankshaft angular speed detecting section, a vibration detecting section, a sound detecting section and a combustion gas ion measuring device. Combustion parameter control section 204 employs at least one of ignition timing, fuel injection timing, fuel injection quantity, in-cylinder temperature, compression ratio, EGR quantity as a combustion parameter by each cylinder.

Figure 43:
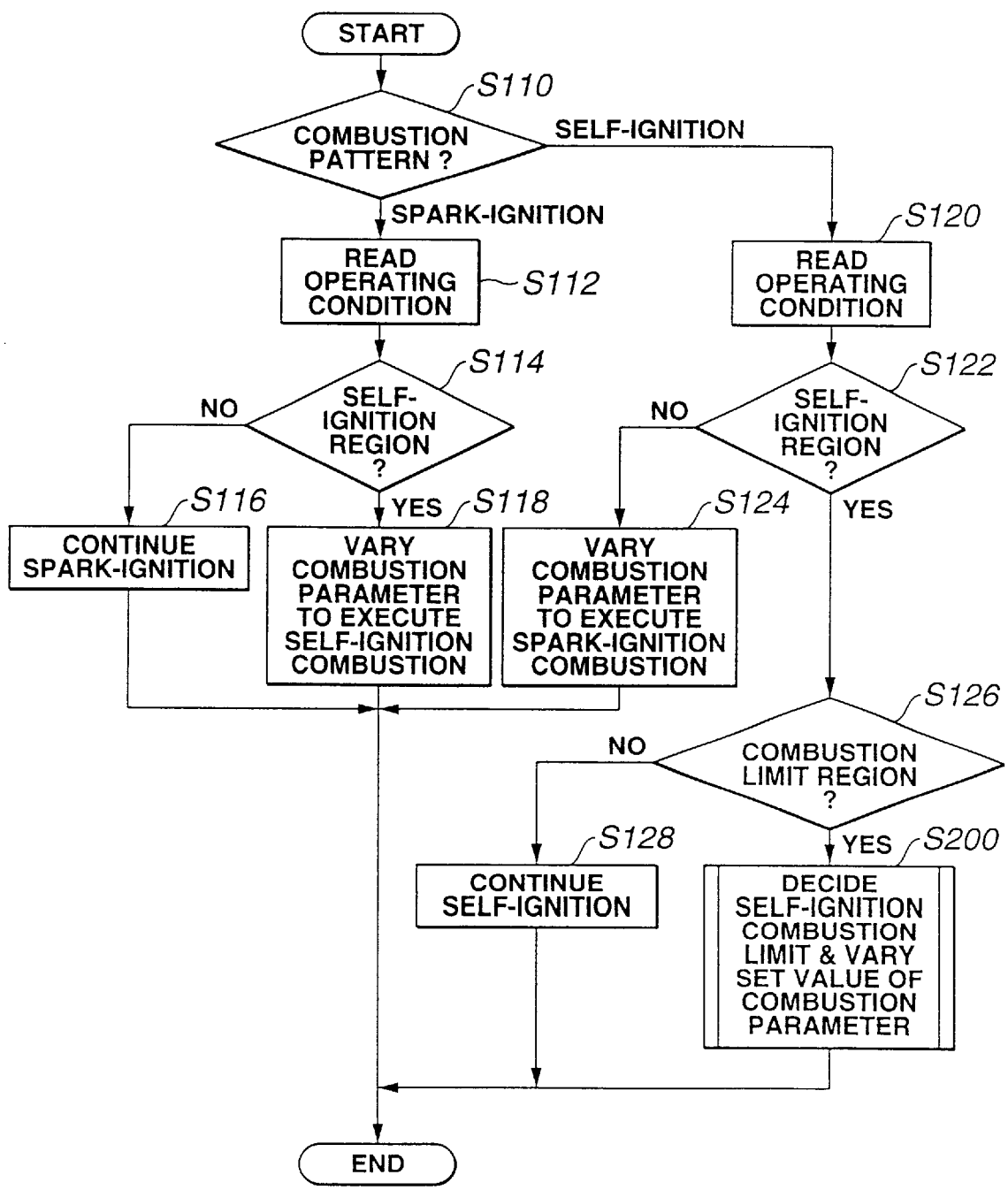
FIG. 43 is a flowchart showing a main control of the seventh embodiment.

FIG. 43 shows a flowchart of a control of the seventh embodiment according to the present invention.

As shown in FIG. 43, at step S110, ECU 203 decides whether a present combustion pattern is a self-ignition combustion or a spark-ignition combustion. When ECU 203 decides at step S110 that the spark-ignition combustion is executed, the routine proceeds to step S112 wherein ECU 203 reads an engine speed and a load of the engine. At step S114 following to step S112, ECU 203 decides whether or not the engine operating condition is in the self-ignition combustion region. When the decision at step S114 is negative, the routine proceeds to step S116 wherein the spark-ignition combustion is continued. When the decision at step S114 is affirmative, ECU 203 starts the self-ignition combustion by executing the following operations: The self-ignition combustion control calculating section 206 of ECU 203 calculates the necessary condition for executing the self-ignition combustion. The self-ignition combustion parameter setting section varies the combustion parameter into a parameter for the self-ignition combustion by combining the operations of the devices in the combustion parameter control section 204 so as to put the engine into the self-ignition combustion condition.

When ECU 203 decides at step S110 that the self-ignition combustion is executed, the routine proceeds to step S120 wherein ECU 203 reads the engine speed and the load of the engine. At step S122 following to step S120, ECU 130 decides whether or not the engine operating condition is in the self-ignition combustion region. When the decision at step S122 is negative, the routine proceeds to step S124 wherein ECU 203 varies the combustion parameter to a parameter for the spark-ignition combustion. When the decision at step S122 is affirmative, the routine proceeds to step S126 wherein ECU 203 decides whether or not the combustion condition is in a self-ignition combustion limit region of the self-ignition combustion region. When the decision at step S126 is negative, that is, when the combustion condition is not in the self-ignition combustion limit region, the routine proceeds to step S128 wherein ECU 203 continues an ordinary self-ignition combustion operation. When the decision at step S126 is affirmative, the routine proceeds to step S200 wherein this routine executes a sub-routine for deciding the self-ignition combustion limit and varying the set value of the self-ignition combustion parameter.

After the execution of step S116, S118, S124, S128 or S200, the routine proceeds to an end block to terminate the present routine.

Figure 44:
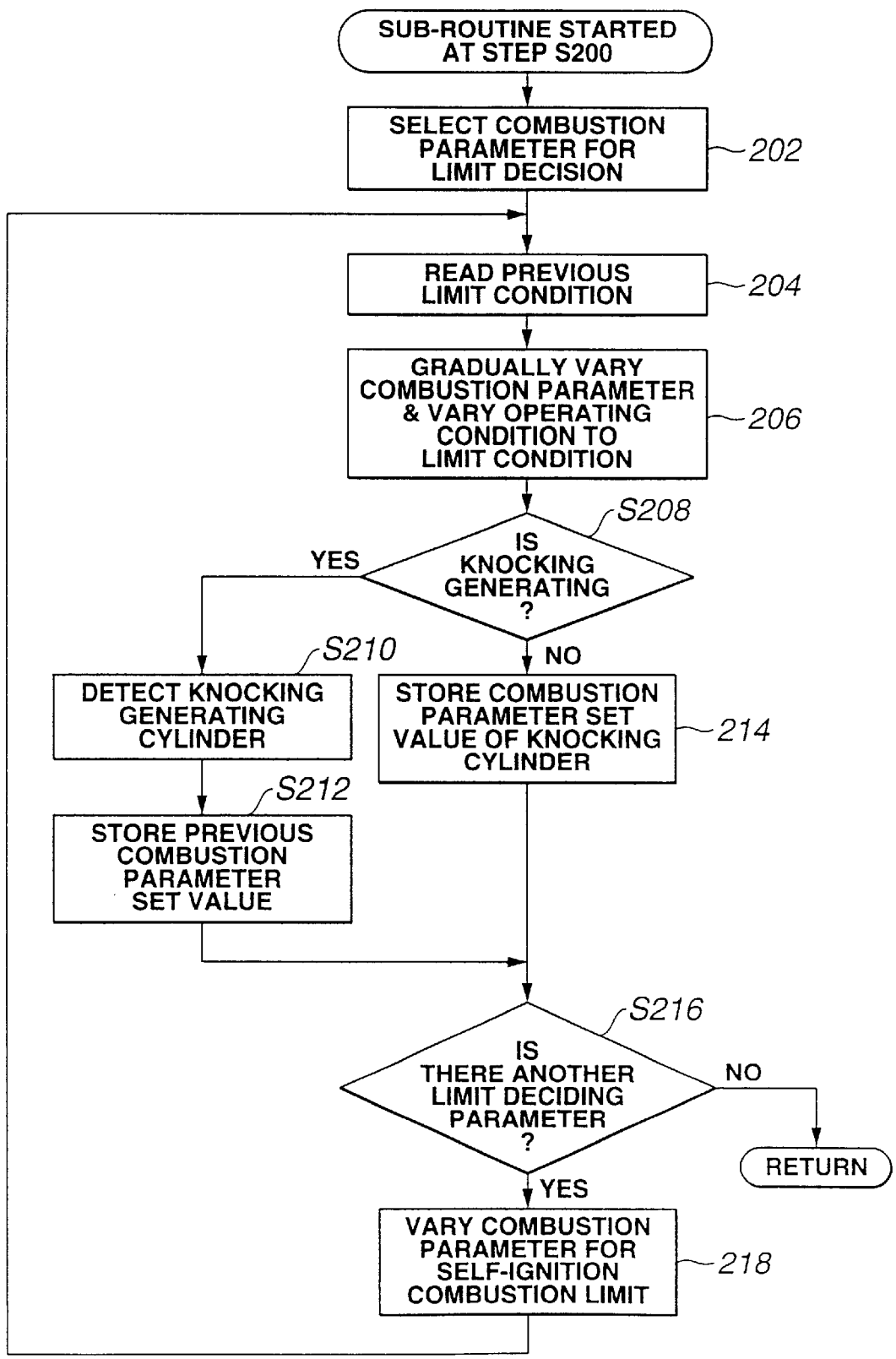
FIG. 44 is a flowchart showing a sub-routine program executed at step S200 of the flowchart in FIG. 43.

FIG. 44 shows the sub-routine for deciding the self-ignition combustion limit and varying the set value of the self-ignition combustion parameter. This sub-routine is executed when the routine executes step S200 in FIG. 43.

At step S202, the self-ignition combustion control calculating section 206 of ECU 203 selects the combustion parameter employed for deciding the self-ignition combustion limit and selects devices in the combustion parameter control section 204 corresponding to the selected combustion parameter. At step S204, ECU 203 reads the set value of the combustion parameter during the self-ignition combustion limit which set value has been stored when a previous self-ignition combustion was executed through combustion parameter control section 204, and indicates the self-ignition combustion limit condition. At step S206, ECU 203 gradually varies the combustion parameter so that the combustion condition is put in a condition obtained by adding a margin to the previous combustion limit condition. At step S208, combustion condition detecting section 202 of ECU 203 monitors the combustion condition whether or not the engine starts knocking. In a case that knock intensity is employed as a decision reference value for deciding the self-ignition combustion limit, ECU 203 decides that the combustion condition reaches the self-ignition combustion limit when ECU 203 detects that the change of the set value for a device of the combustion parameter control section 204 takes a value indicative of the knocking generating limit.

When the decision at step S208 is negative, the routine proceeds to step S214 wherein ECU 203 decided the condition in the combustion chamber is not varied, and stores the previous combustion limit condition. When the decision at step S208 is affirmative, the routine proceeds to step S210 wherein ECU 203 detects which cylinder is generating knocking. At step S212 following to the execution of step S210, ECU 203 stores the limit set value at the timing that the knocking is generated as a new limit value. At step S216, ECU 203 decides whether or not there is another combustion parameter for deciding the self-ignition combustion limit. When the decision at step S216 is affirmative, the routine proceeds to step S218 wherein ECU 203 newly selects the combustion parameter from deciding the self-ignition combustion limit. After the execution of step S218, the routine returns to step S204 to repeat the process for deciding the combustion parameter for deciding the self-ignition combustion limit until there is not a further another combustion parameter. When the decision at step S216 is negative, the routine proceeds to a return block to terminate this sub-routine and to return to the main program shown in FIG. 42.

The decision reference value of deciding the self-ignition combustion limit may be selected from the signals detected by combustion condition detecting section 2 as is similar to the manner executed in the first embodiment.

Figure 45:
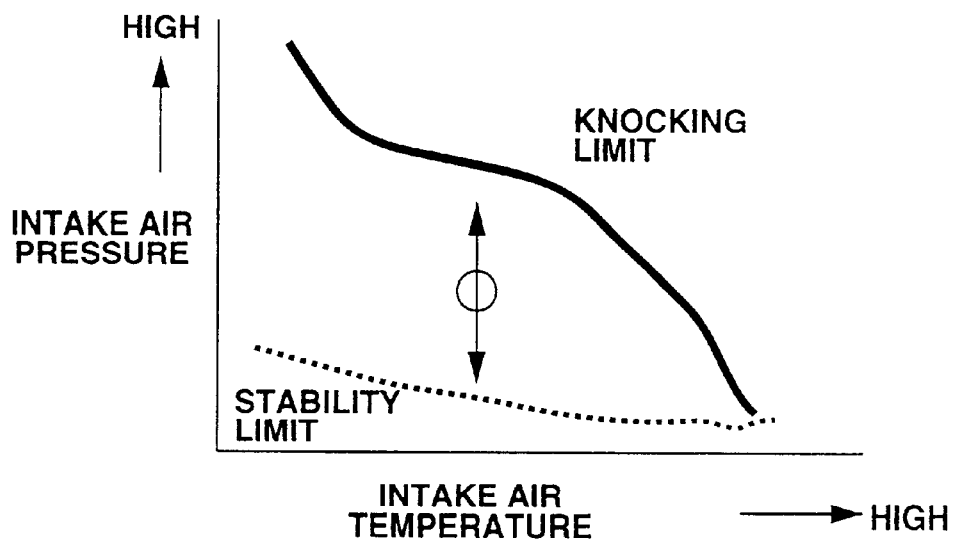
FIG. 45 is a graph showing the knocking limit and the combustion stability limit with respect to an intake air pressure and an intake air temperature acting as combustion parameter.
Figure 46:
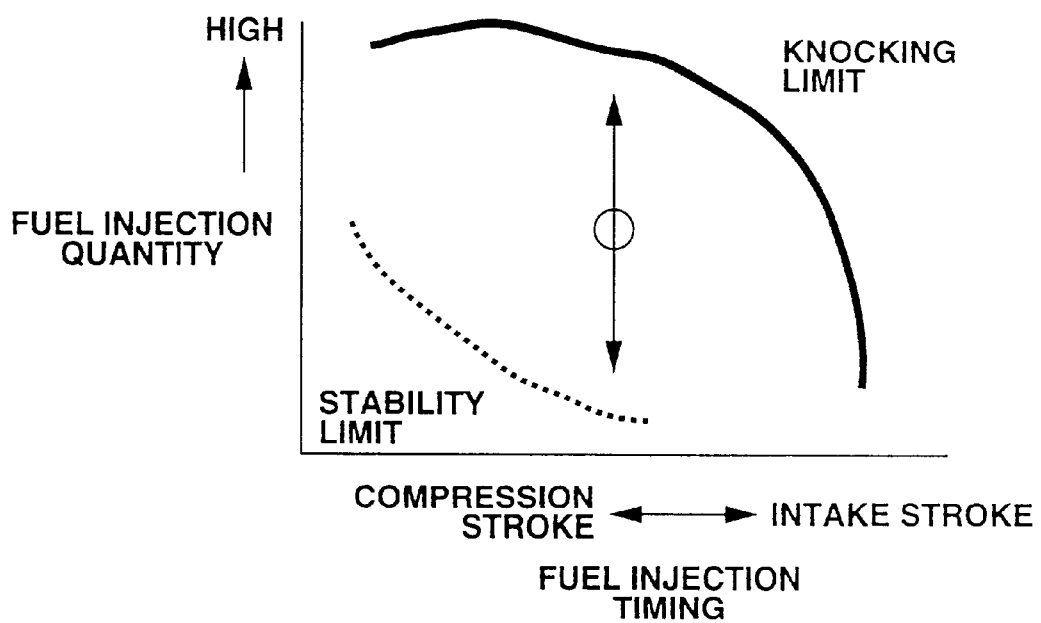
FIG. 46 is a graph showing the knocking limit and the combustion stability limit with respect to a fuel injection timing and a fuel injection quantity acting as combustion parameter.
Figure 47:
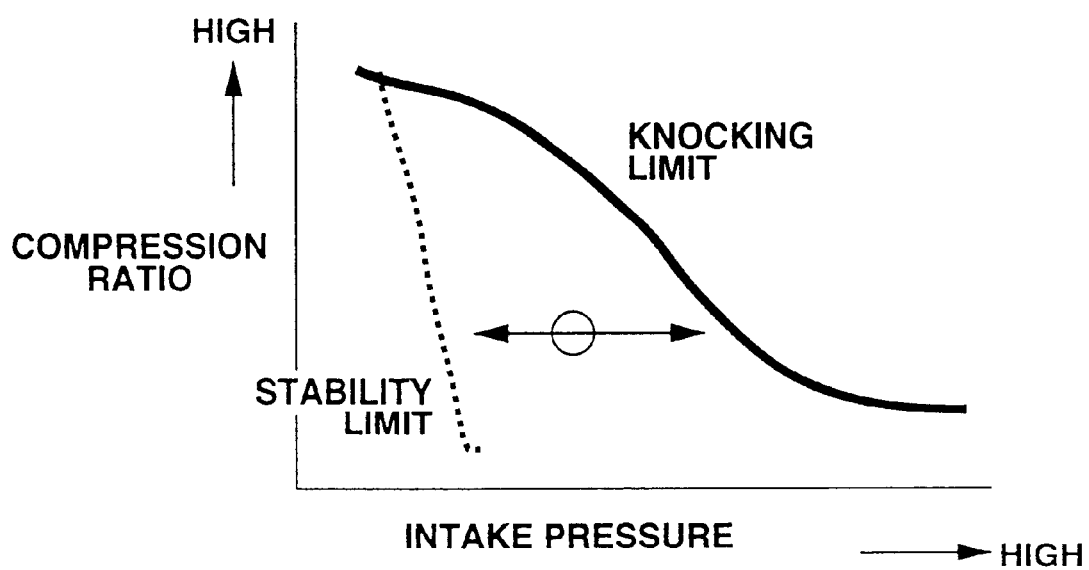
FIG. 47 is a graph showing the knocking limit and the combustion stability limit with respect to a the intake air pressure and a compression ratio acting as combustion parameter.

With reference to FIGS. 45 to 47, the combustion parameter employed for deciding the self-ignition combustion will be discussed.

FIG. 45 shows the self-ignition combustion limit relative to the intake air pressure and the intake air temperature which are employed as the combustion parameter. As is clear from FIG. 45, at each intake air pressure, the knocking limit is located at a higher side of the intake air pressure, and the combustion stability limit is located at a lower side of the intake air pressure. Accordingly, by increasing the intake air pressure, the combustion condition reaches the knocking limit, and by decreasing the intake air pressure, the combustion condition reaches the combustion stability limit.

FIG. 46 shows the self-ignition combustion limit relative to the fuel injection timing and the fuel injection quantity which are employed as the combustion parameter. As is clear from FIG. 46, at each fuel injection timing, the knocking limit is located at a higher side of the fuel injection quantity, and the combustion stability limit is located at a lower side of the fuel injection quantity. Accordingly, by increasing the fuel injection quantity, the combustion condition reaches the knocking limit, and by decreasing the fuel injection quantity, the combustion condition reaches the combustion stability limit.

FIG. 47 shows the self-ignition combustion limit relative to the intake air pressure and the compression ratio which are employed as the combustion parameter. As is clear from FIG. 47, at each compression ratio, the knocking limit is located at a higher side of the intake air pressure, and the combustion stability limit is located at a lower side of the intake air pressure. Accordingly, by increasing the intake air pressure, the combustion condition reaches the knocking limit, and by decreasing the intake air pressure, the combustion condition reaches the combustion stability limit.

Therefore, ECU 203 can detect the knocking limit and the combustion stability limit of the self-ignition combustion limit by properly varying the combustion parameter.

Next, an eighth embodiment according to the present invention will be discussed with reference to FIG. 48. The construction of the eighth embodiment is basically the same as that of the seventh embodiment shown in FIG. 42. The eighth embodiment is arranged, such that when combustion condition detecting section 202 of ECU 203 detects the self-ignition combustion limit during a setting of a condition for starting the self-ignition combustion by combining devices of combustion parameter control section 204 in order to change the combustion condition from the spark-ignition combustion to the self-ignition combustion, ECU 203 detects a cylinder where the combustion condition is in the self-ignition combustion limit and sets a new limit value of the combustion parameter as to this selected cylinder.

The manner of operation of the eighth embodiment according to the present invention will be discussed with reference to a flowchart shown in FIG. 48.

At step S150, ECU 203 decides whether a present combustion pattern is the self-ignition combustion or the spark-ignition combustion. When ECU 203 decides at step S150 that the spark-ignition combustion is executed, the routine proceeds to step S152 wherein ECU 203 reads an engine speed and a load of the engine. At step S154 following to step S152, ECU 203 decides whether or not the engine operating condition is in the self-ignition combustion region. When the decision at step S154 is negative, the routine proceeds to step S166 wherein the spark-ignition combustion is continued. When the decision at step S154 is affirmative, the routine proceeds to step S158 wherein ECU 203 starts the self-ignition combustion by executing the following operations: The self-ignition combustion control calculating section 206 of ECU 203 calculates the necessary condition for executing the self-ignition combustion. The self-ignition combustion parameter setting section varies the combustion parameter into a parameter for the self-ignition combustion by combining the operations of the devices in the combustion parameter control section 204 so as to put the engine into the self-ignition combustion condition. Following to the execution of step S158, the routine proceeds to step S160 wherein ECU 203 decides whether knocking is generated or not. More specifically, ECU 203 decides whether or not the knocking level is greater than or equal to a predetermined level to detect the generation of knocking, by executing the check and decision as to whether or not the fluctuation of the angular speed of the crankshaft is greater than or equal to a predetermined level, or whether or not the fluctuation of the in-cylinder pressure by each combustion is greater than or equal to a predetermined level, or whether or not the vibration or sound level by each cylinder is greater than or equal to a predetermined level, or whether or not the combination of the signals detected at combustion condition detecting section indicates the generation of knocking.

When the decision at step S160 is affirmative, the routine proceeds to step S168 wherein ECU 203 detects the cylinder where knocking is generating. At step S170 following the execution of step S168, ECU 203 varies the self-ignition combustion parameter of the knocking generating cylinder. When the decision at step S160 is negative, the routine proceeds to step S162 wherein ECU 203 decided whether or not the combustion condition is unstable (detection of the combustion stability). When the decision at step S162 is affirmative, that is, when the combustion condition is unstable, the routine proceeds to step S164 wherein ECU 203 detects the cylinder where the combustion condition is unstable. At step S166 following the execution of step S164, ECU 203 varies the set value of the self-ignition combustion parameter of the combustion unstable cylinder.

When ECU 203 decides at step S150 that the combustion pattern is the self-ignition combustion, the routine proceeds to step S172 wherein ECU 203 reads the engine speed and the load of the engine. At step S174 following to step S172, ECU 130 decides whether or not the engine operating condition is in the self-ignition combustion region. When the decision at step S174 is negative, the routine proceeds to step S176 wherein ECU 203 varies the combustion parameter to a parameter for the spark-ignition combustion. When the decision at step S174 is affirmative, the routine proceeds to step S178 wherein ECU 203 decides whether or not the combustion condition is in a self-ignition combustion limit region of the self-ignition combustion region. When the decision at step S178 is negative, that is, when the combustion condition is not in the self-ignition combustion limit region, the routine proceeds to step S180 wherein ECU 203 continues an ordinary self-ignition combustion operation. When the decision at step S178 is affirmative, the routine proceeds to step S200 wherein this routine executes the sub-routine for deciding the self-ignition combustion limit and varying the set value of the self-ignition combustion parameter. This sub-routine is completely the same as that of the seventh embodiment shown in FIG. 43.

Figure 48:
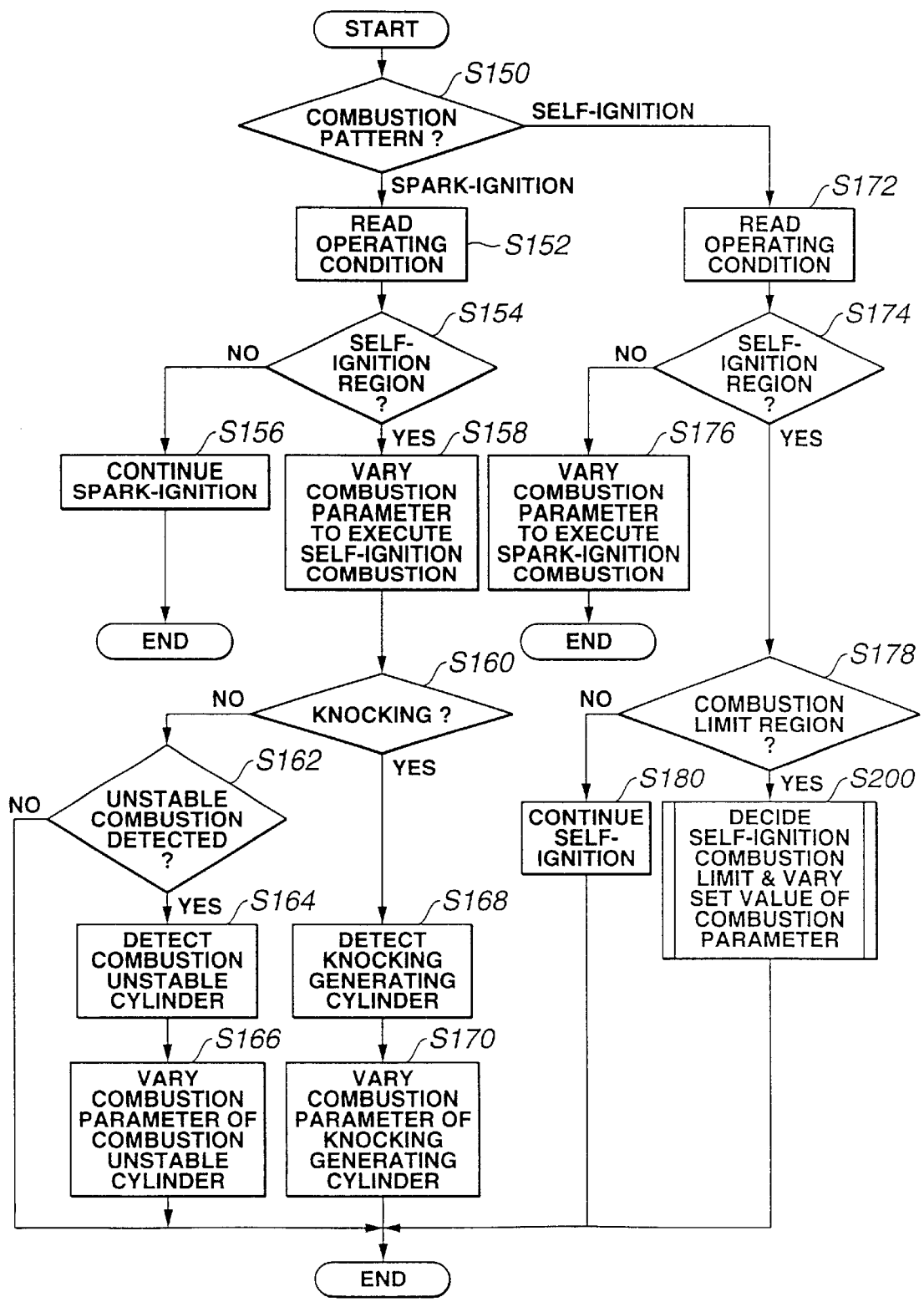
FIG. 48 is a flowchart showing the main control of an eighth embodiment.

After the execution of step S156, S166, S170, S176, S180, S200 or the negative decision at step S162, the routine of the flowchart in FIG. 48 is terminated.

In the eighth embodiment, ECU 203 also employs the relationships of the combination of the combustion parameter and the combustion condition shown in FIGS. 45 to 47.

The entire contents of Japanese Patent Applications No. 11-253370 filed on Sep. 7, 1999 and No. 2000-265956 filed on Sep. 1, 2000 in Japan are incorporated herein by reference.

Although the invention has been described above by reference to certain embodiments of the invention, the invention is not limited to the embodiments described above. Modifications and variations of the embodiment described above will occur to those skilled in the art, in light of the above teaching. The scope of the invention is defined with reference to the following claims.

What is claimed is:

1. A control system of a self-ignition gasoline engine, the control system changing a combustion condition of the engine between a self-ignition combustion and a spark-ignition combustion according to an operating condition of the engine, the control system comprising:

a combustion condition detector that detects an combustion condition in the engine; and an engine control unit connected to said combustion condition detector, said engine control unit detecting a self-ignition limit of a self-ignition combustion region on the basis of the combustion condition, and varying a combustion parameter during the operation of the self-ignition combustion, so that the combustion condition approaches the self-ignition combustion limit and the self-ignition combustion operation is executed under a condition maintaining the self-ignition limit.

2. The engine control system as claimed in claim 1, wherein the combustion parameter includes at least one of an in-cylinder pressure, an ignition timing, a fuel injection timing, a fuel injection quantity, an in-cylinder temperature, a compression ratio, an exhaust gas recirculation (EGR) quantity, an intake air temperature, an intake air pressure, a combustion chamber temperature and a valve timing.

3. The engine control system as claimed in claim 1, wherein the self-ignition combustion limit is a knocking limit which is detected from at least one of an in-cylinder pressure, an angular speed of a crankshaft, a vibration of a combustion chamber defining member, a sound generated at a combustion chamber defining member and an ion in combustion gas.

4. The engine control system as claimed in claim 1, wherein the self-ignition combustion limit is a stability limit which is detected from at least one of an in-cylinder pressure, an angular speed of a crankshaft, a vibration of a combustion chamber defining member, a sound generated at a combustion chamber defining member and an ion in combustion gas.

5. The engine control system as claimed in claim 1, wherein said control unit changes the self-ignition combustion limit between a knocking limit and a stability limit according to the engine operating condition.

6. The engine control system as claimed in claim 5, wherein the control unit selects the knocking limit as the self-ignition combustion limit when the engine operates under a low load condition, and selects the stability limit as the self-ignition combustion limit when the engine operates under an intermediate or high load condition.

7. The engine control system as claimed in claim 5, further comprising a catalyst temperature detector that detects a temperature of a catalyst installed to the engine, said control unit being connected to the catalyst temperature detector and selecting the stability limit as the self-ignition combustion limit when the catalyst temperature is lower than a predetermined temperature.

8. The engine control system as claimed in claim 1, wherein when the engine operating condition is in some part of a predetermined region of the self-ignition region, said control unit varies the combustion parameter during the self-ignition combustion operation so that the combustion condition approaches the self-ignition combustion limit and the self-ignition combustion operation is executed under the condition maintaining the self-ignition limit.

9. The engine control system as claimed in claim 1, wherein said control unit has a storage section for storing the combustion parameter, said control unit storing the combustion parameter for the self-ignition combustion limit as a target combustion parameter in the storage second and executing a learning control of the target combustion parameter when said control unit varies the combustion parameter during the self-ignition combustion operation so that the combustion condition approaches the self-ignition combustion limit and the self-ignition combustion operation is executed under a condition maintaining the self-ignition limit.

10. The engine control system as claimed in claim 1, further comprising an each-cylinder self-ignition limit detector for detecting a self-ignition limit by each cylinder, the each-cylinder self-ignition said control unit varying the combustion parameter by each cylinder of the engine during the self-ignition combustion operation so that the combustion condition approaches the self-ignition combustion limit by each cylinder and the self-ignition combustion operation is executed by each cylinder under a condition maintaining the each-cylinder self-ignition limit.

11. The engine control system as claim in claim 10, wherein said control unit has a storage section for storing the combustion parameter for each cylinder, said control unit storing the each-cylinder combustion parameter for the self-ignition combustion limit as a target combustion parameter in the storage section and executing a learning control of the each cylinder target combustion parameter when said control unit varies the each cylinder combustion parameter so that the each-cylinder combustion condition approaches the self-ignition combustion limit by each cylinder and the self-ignition combustion operation is executed by each cylinder under a condition maintaining the self-ignition limit.

12. A control system of a self-ignition gasoline engine, the control system changing a combustion condition of the engine between a self-ignition combustion and a spark-ignition combustion according to an operating condition of the engine, the control system comprising:

combustion condition detecting means for detecting an combustion condition in the engine;

self-ignition limit detecting means for detecting a self-ignition limit of a self-ignition combustion region on the basis of the combustion condition; and combustion parameter varying means for varying a combustion parameter during a self-ignition combustion so that the combustion condition approaches the self-ignition combustion limit and a self-ignition combustion operation is executed under a condition maintaining the self-ignition limit.

13. A method of controlling a self-ignition gasoline engine which is capable of changing a combustion condition of the engine between a self-ignition combustion and a spark-ignition combustion according to an operating condition of the engine, the method comprising:

detecting an combustion condition in the engine;

detecting a self-ignition limit of a region for executing the self-ignition combustion on the basis of the combustion condition; and varying a combustion parameter for the combustion during the self-ignition combustion so that the combustion condition approaches the self-ignition combustion limit and a self-ignition combustion operation is executed under a condition maintaining the self-ignition limit.

* * * * *